(12) United States Patent
Kamisada et al.

(10) Patent No.: US 7,885,166 B2
(45) Date of Patent: Feb. 8, 2011

(54) OPTICAL PICK UP APPARATUS WITH A SINGLE BEAM SYSTEM AND HAVING A DIFFRACTION GRATING

(75) Inventors: Toshimasa Kamisada, Yokohama (JP);
Yasuo Kitada, Odawara (JP);
Kazuyoshi Yamazaki, Kawasaki (JP);
Tomoto Kawamura, Tokyo (JP);
Yoshiro Konishi, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 11/979,129

(22) Filed: Oct. 31, 2007

(65) Prior Publication Data
US 2008/0094949 A1    Apr. 24, 2008

Related U.S. Application Data

(62) Division of application No. 11/680,705, filed on Mar. 1, 2007, now Pat. No. 7,567,495.

(30) Foreign Application Priority Data

Oct. 18, 2006   (JP) .............................. 2006-283245
Oct. 18, 2006   (JP) .............................. 2006-283248

(51) Int. Cl.
    *G11B 7/135* (2006.01)
(52) U.S. Cl. ................................. 369/112.12
(58) Field of Classification Search ............. 369/44.41, 369/120, 112.07, 112.12
    See application file for complete search history.

(56) References Cited

U.S. PATENT DOCUMENTS

| | | | | |
|---|---|---|---|---|
| 5,412,631 A | * | 5/1995 | Komma et al. | 369/44.37 |
| 5,446,565 A | * | 8/1995 | Komma et al. | 369/44.23 |
| 5,754,503 A | * | 5/1998 | Senba et al. | 369/44.23 |
| 5,856,961 A | * | 1/1999 | Brazas et al. | 369/44.23 |
| 6,185,167 B1 | * | 2/2001 | Arai et al. | 369/44.23 |
| 6,618,346 B1 | * | 9/2003 | Maeda et al. | 369/118 |
| 2004/0228236 A1 | * | 11/2004 | Sakai et al. | 369/44.41 |

(Continued)

FOREIGN PATENT DOCUMENTS

CN   1485828   3/2004

(Continued)

OTHER PUBLICATIONS

S. Kano, "Novel One-Beam Tracking Detection Method for Dual-Layer Blu-Ray Discs", IEICE Technical Report, CPM 2005-149 (Oct. 2005).

(Continued)

*Primary Examiner*—Peter Vincent Agustin
*Assistant Examiner*—Mark L Fischer
(74) *Attorney, Agent, or Firm*—Antonelli, Terry, Stout & Kraus, LLP.

(57) ABSTRACT

An optical pickup apparatus includes a semiconductor laser for emitting a laser light, an objective lens for irradiating the light flux emitted from the semiconductor laser onto an optical disc, and a light detector for receiving the light flux reflected from the optical disc. The light detector has a light receiving part that comprises a region 1, a region 2, a region 3, a region 4, a region 5, a region 6 and a region 7.

8 Claims, 29 Drawing Sheets

U.S. PATENT DOCUMENTS

2005/0199778 A1* 9/2005 Kadowaki et al. ........ 250/201.5
2009/0028036 A1 1/2009 Nishiwaki et al.

FOREIGN PATENT DOCUMENTS

| JP | 4-119531 | 4/1992 |
|---|---|---|
| JP | 09-223321 | 8/1997 |
| WO | WO 2007/105704 | 9/2007 |

OTHER PUBLICATIONS

Japanese Office Action in connection with 2006-283248 mailed Jan. 13, 2009.
Official Action issued Japanese Patent Application No. 2006-283245 on Aug. 17, 2010.
Office Action issued Japanese Patent Application No. 2009-062236 on Nov. 30, 2010.

* cited by examiner

FIG. 4A  FIG. 4B  FIG. 4C
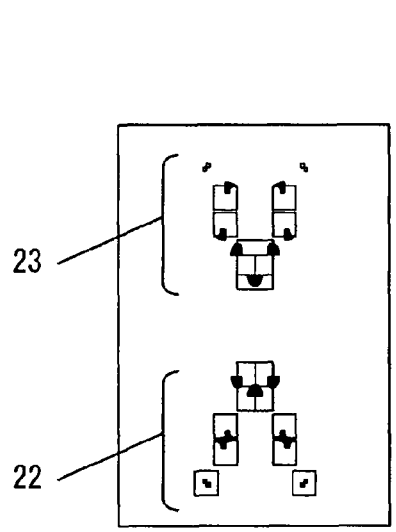
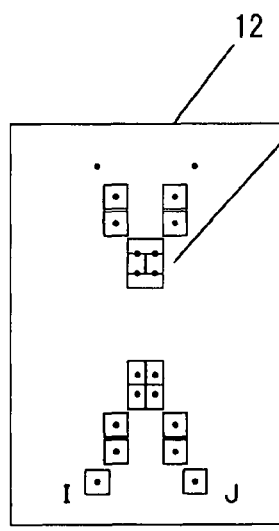
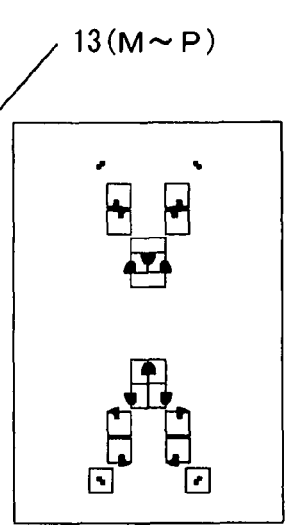
FIG. 4D
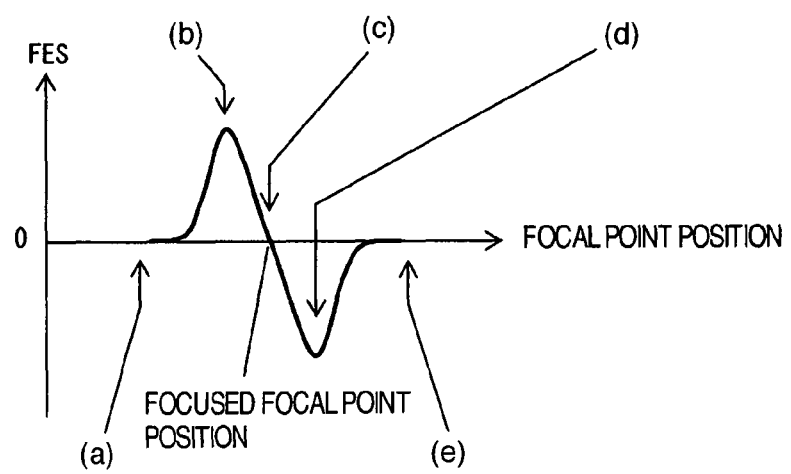

OPTICAL PICK UP APPARATUS WITH A SINGLE BEAM SYSTEM AND HAVING A DIFFRACTION GRATING

CROSS REFERENCE TO RELATED APPLICATION

This application is a divisional of U.S. application Ser. No. 11/680,705, filed Mar. 1, 2007, now U.S. Pat. No. 7,567,495, the contents of which are incorporated herein by reference. This application relates to U.S. application Ser. Nos. 11/929,130, 11/929,131 and 11/929,132 filed Oct. 30, 2007, which are divisional applications of U.S. Ser. No. 11/680,705, filed Mar. 1, 2007.

INCORPORATION BY REFERENCE

The present application claims priorities from Japanese applications JP2006-283248 filed on Oct. 18, 2006, JP2006-283245 filed on Oct. 18, 2006, the contents of which are hereby incorporated by reference into this application.

BACKGROUND OF THE INVENTION

The present invention relates to an optical disc apparatus for recording information on or reproducing information from an optical disc, and to an optical pickup apparatus used for the same. More particularly, the present invention relates to an optical disc apparatus for recording information on or reproducing information from an optical disc that has a plurality of laminated information recording layers, and to an optical pickup apparatus used for the same.

A technology of a multilayer optical disc having laminated information recording layers has been studied as a method of increasing the storage capacity of the optical disc. In the standard of a DVD (Digital Versatile Disc), BD (Blue-ray Disc) and HD-DVD (High Density Digital Versatile Disc), a two-layer optical disc is commercialized in which two information recording layers are laminated at an interval of about 20 to 55 μm. In addition, a three- or more-layer optical disc has also been studied as a technology of achieving a larger capacity.

When recording information on or reproducing information from the multilayer optical disc, it is necessary to eliminate as much as possible the offset of a servo signal such as a focus error signal or a tracking error signal caused by a stray light from other layer.

A method of eliminating the effect due to the stray light from other layer is described, for example, in an article of "Journal of Institute of Electronics Information and Communication Engineers" CPM2005-149 (2005-10), which describes about the placement of a tracking photodetector in a region free of a stray light from other layer.

However, the above article (CPM2005-149(2005-10)) does not describe about the effect that the stray light has on the focus error signal.

Furthermore, in the above article (CPM2005-149(2005-10)), it is required to dispose a light receiving part for the tracking error signal outside the stray light from other layer that occurs around the light receiving part for the focus error signal, thus the size of a light detector being increased.

A background art of the optical pickup apparatus is proposed in a Japanese Laid-open Patent Application JP-A-9-223321. In the Laid-open Patent Application JP-A-9-223321, PROBLEM TO BE SOLVED reads as follows: To provide an optical information reproducing apparatus that can be simplified by reducing the number of optical parts, and to provide a method of adjusting the optical information reproducing apparatus that enables the adjustment of a tracking error signal in accordance with the characteristic of an optical disc. SOLUTION reads as follows: The optical information reproducing apparatus comprises: an optical pickup having an objective lens for irradiating the optical disc with light; a first dividing means for dividing a light spot of a light emitted from the optical disc substantially perpendicularly to the direction equivalent to a track to form a light spot on an end region and a light spot on a middle region relative to the center of the light spot; a second dividing means for further dividing the light spots on the end region and middle region in substantially parallel to the direction equivalent to the track of the optical disc; a light receiving element having a plurality of light receiving cells for receiving the light divided by the first and second dividing means; a light spot displacement signal detecting means for computing the outputs of the light receiving cells that receive the light on the middle region divided by the second dividing means to detect the relative displacement of the light spots on the light receiving element; a tracking error generating means for computing the outputs of the light receiving cells that receive the light on the middle region divided by the second dividing means to detect a relative displacement between the track and objective lens; an offset correction means for correcting the offset of the tracking error signal by the computing the output signal of the light spot displacement signal detecting means and the output signal of the tracking error generating means; an objective lens driving device for driving the objective lens in the direction across the track of the optical disc; a tracking control means for drive-controlling the objective lens driving device; and a switching means for switching the input of the tracking control means to the output of the light spot displacement signal detecting means during an access, and for switching the input of the tracking control means to the output of the tracking error generating means via the offset correction means during reproducing of the information of the optical disc.

SUMMARY OF THE INVENTION

In the optical pickup apparatus, generally, in order to correctly irradiate a spot on a given record track in the optical disc, an objective lens is displaced in the focusing direction through the detection of a focus error signal, thus the objective lens being adjusted in the focus direction. Furthermore, the objective lens is displaced in the radial direction of a disc shape recording medium through the detection of a tracking error signal, thus the tracking adjustment is performed. These signals allow the objective lens to be position-controlled.

While a push pull method is known as a tracking error signal detection method of the above error signal detections, it has a problem that a direct current fluctuation (referred to as a DC offset hereinafter) is prone to occur. Therefore, a differential push pull method is widely used that is capable of reducing the DC offset.

The differential push pull method divides a light flux into a main light flux and a sub light flux through a diffraction grating and reduces the DC offset using a spot of the main light flux and a spot of the sub light flux in the radial direction.

However, since the differential push pull method forms a plurality of spots on the optical disc, light use efficiency of the main light flux decreases. The main light flux not only generates a focus error signal and a tracking error signal, but also has a function of forming a record mark on the recording optical disc. When performing recording on the recording optical disc, its writing speed becomes faster the larger the light amount of the main light flux on the disc is. Therefore, it is disadvantageous to use the diffraction grating for an outward optical system from a viewpoint of writing speed.

Therefore, in the above JP-A-9-223321, one spot is formed on the disc, and its reflective light is divided into a plurality of regions, thus inspecting a stable tracking error signal free of the DC offset even if the objective lens is displaced in the tracking direction. This structure has an advantage that the writing speed can be increased without reducing the light use efficiency. (referred to as a one-beam method hereinafter)

However, when the detector is divided into regions as in the above JP-A-9-223321, a problem occurs in a recording type optical disc, such as, for example, BD-RE or BD-R. In the recording type optical disc, there exist a region where recording is not performed (referred to as an unrecorded region hereinafter) and a region where recording is already performed (referred to as a recorded region hereinafter). When the region is divided as described in the above JP-A-9-223321, it is impossible to reduce the offset of the tracking error signal occurring at the boundary between the unrecorded region and recorded region on the disc, posing a problem.

It is an object of the present invention to provide an optical pickup apparatus capable of obtaining an stable servo signal and an optical disc apparatus equipped with the same.

In order to solve the above problems, the optical pickup apparatus according to the present invention comprises: a light source; an objective lens for focusing a light flux emitted from the light source on the optical disc; a dividing element for dividing the light flux reflected from the optical disc into a plurality of light fluxes; a condenser lens for condensing the light flux reflected from the optical disc; and a light detector for receiving the light flux condensed by the condenser lens with a plurality of light receiving parts to convert it into an electrical signal. The dividing element has a first divided region disposed almost on the center; a second divided region comprised of four regions which are divided by a first dividing line and disposed along the direction of the first dividing line to sandwich the first divided region; and a third divided region comprised of four regions which are divided by a second dividing line perpendicular to the first dividing line and disposed along the direction of the second dividing line to sandwich the first divided region. Each of the first to third divided regions is structured such that when a target information recording layer of the optical disc is brought into focus, a reflective light flux from the target information recording layer is focused on the light receiving parts of the light detector, and a reflective light flux from a recording reproducing layer other than the target information recording layer is not irradiated onto the light receiving parts of the light detector.

The present invention enables the one beam tracking method to obtain a stable focus error signal and tracking error signal.

Furthermore, the present invention improves the offset of the tracking error signal occurring at the boundary between the unrecorded region and recorded region, which is a problem of the above one-beam method. More specifically, the present invention provides an optical pickup apparatus, an optical information reproducing apparatus or an optical information recording and reproducing apparatus that uses a novel tracing error detecting means capable of detecting a stable tracking error signal even if there exists a boundary between the unrecorded region and recorded region on the optical disc.

It is an object of the present invention to provide the optical pickup apparatus and optical information recording and reproducing apparatus that are capable of detecting a stable tracking error signal.

The above objects are implemented by the structure described in the claim as an example.

Other objects, features and advantages of the invention will become apparent from the following description of the embodiments of the invention taken in conjunction with the accompanying drawings.

BRIEF DESCRIPTION OF THE DRAWINGS

FIGS. 4A to 4F are diagrams showing how light patterns in an embodiment of the present invention change;

DESCRIPTION OF THE EMBODIMENTS

First, embodiments of the optical pickup apparatus according to the present invention will be described. The optical pickup apparatus according to the present invention is structured such that for example a reflected light from a multilayer disc is divided into a plurality of reflected light fluxes having different outgoing directions and the divided light fluxes are focused on different positions on a light detector. Furthermore, the optical pickup apparatus according to the present invention is structured such that a photo focus error signal is detected using a reflected light flux passing through a region that does not include the light flux center out of the reflected light fluxes passing through a dividing element according to a knife edge method, and a tracking error signal is detected using a reflected light flux passing through a region that does not include the light flux center. Moreover, when a target layer is focused, each region of the dividing element and the light receiving parts are disposed to prevent a stray light from other layer from entering the light receiving parts for a servo signal of the light detector.

An embodiment of the optical pickup apparatus and optical disc apparatus equipped with the same according to the present invention will be described with reference to FIGS. 1 to FIGS. 5A to 5E.

Embodiment 1

Figure 1:
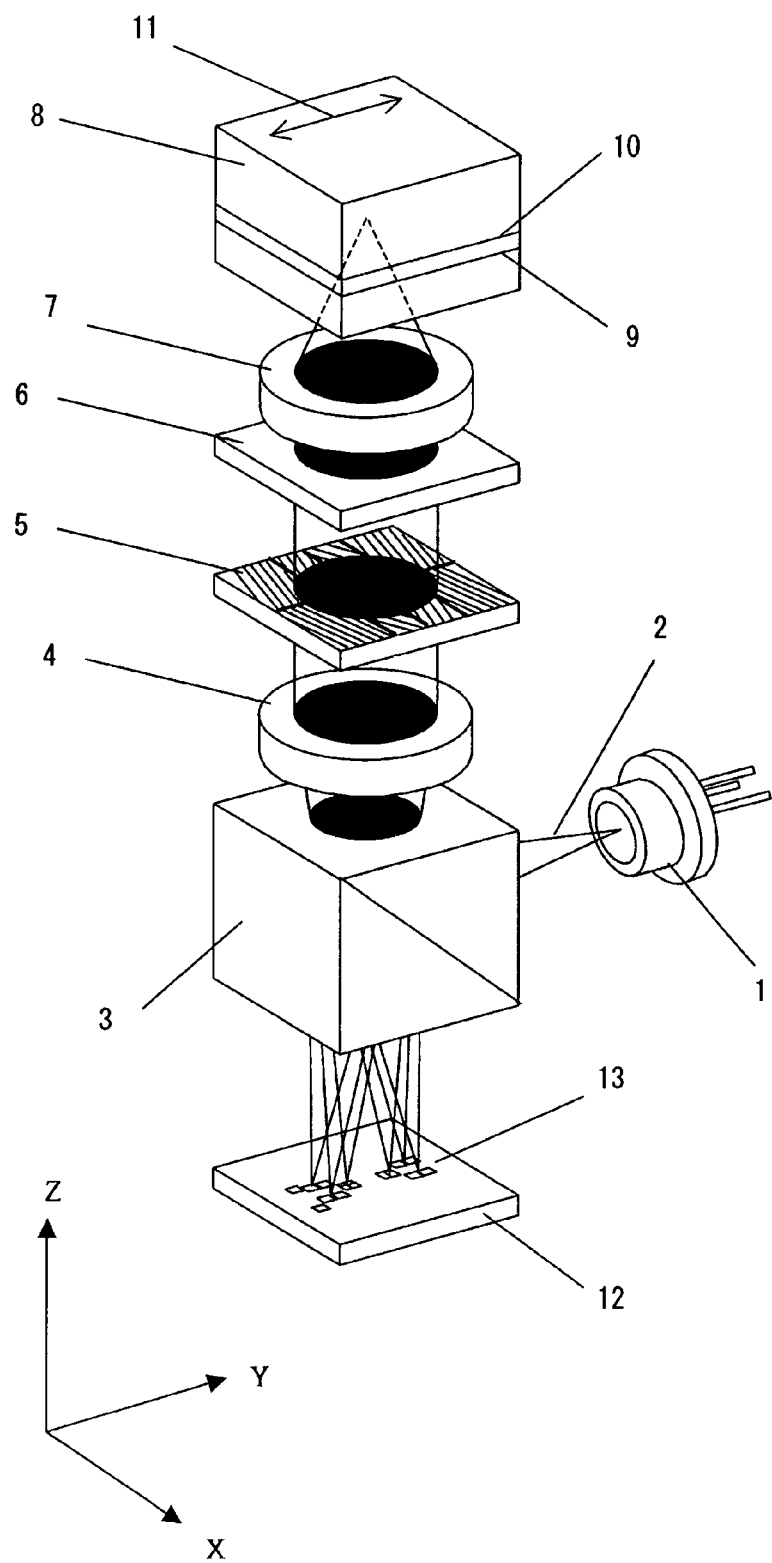
FIG. 1 is a diagram showing an optical pickup apparatus as an embodiment of the present invention.

FIG. 1 is a diagram showing the structure of the optical pickup apparatus according to the present invention.

A laser light 2 emitted from a semiconductor laser 1 is reflected by a polarizing beam splitter 3 and converted into a parallel light flux by a collimate lens 4. The parallel light flux passes through a polarizing diffraction grating 5 and a one-quarter wave plate 6, and is focused by an objective lens 7 on an optical disc 8. The optical disc 8 is provided with a recording and reproducing layer (information recording layer) comprising two layers of a first layer 9 and a second layer 10, with each layer being formed with a track (not shown) in the direction of arrow 11.

When any of the two recording and reproducing layers of the optical disc is in focus, the laser light is reflected by the optical disc 8 and passes through the objective lens 7 and one-quarter wave plate 6. Then, the laser flux is divided by the polarizing diffraction grating 5 to enter a plurality of regions, with each light flux advancing in different directions. Then, the light flux passes through the collimate lens 4 and polarizing beam splitter 3, and is focused on a light detector 12.

A plurality of light receiving parts 13 are formed on the light detector 12, and the light flux divided by the polarizing diffraction grating 5 is irradiated onto each of the light receiving parts 13. Electrical signals are outputted from the light detector 12 in response to the amount of light irradiated onto the light receiving parts 13. The outputs are computed to generate a focus error signal and a tracking error signal.

In the description hereinafter, when the optical pickup apparatus is disposed to face the optical disc for the purpose of recording or reproducing, the direction perpendicular to the surface of the optical disc 8 is defined as a Z axis, the track direction as a Y axis, and the direction perpendicular to the track as an X axis. The Z axis is substantially parallel with the optical axis of the light flux emitted from the objective lens 7.

Figure 2:
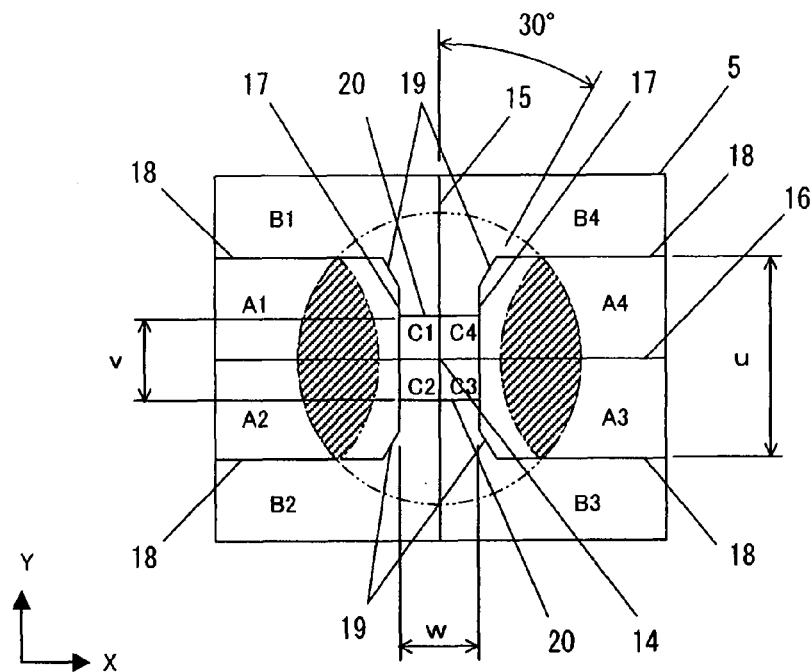
FIG. 2 is a diagram showing the shape of a polarizing diffraction grating in an embodiment of the present invention.

FIG. 2 shows the shape of the polarizing diffraction grating 5 of FIG. 1. The polarizing diffraction grating 5 is divided into a plurality of regions. In FIG. 2, solid lines show boundary lines, while an alternate long and two short dashes line schematically shows the outside shape of the light flux of a laser light, and shadow areas schematically show a push pull pattern occurring due to the track of the optical disc.

The polarizing diffraction grating 5 is formed with a dividing line 15 in the Y-axis direction that passes through the light flux center 14, and with a dividing line 16 in the X-axis direction. The polarizing diffraction grating 5 is also formed with a divided region (first divided region) that comprises four regions (regions C1 to C4) which are point-symmetrical to each other with respect to the light flux center 14 and includes the light flux center 14; a divided region (second divided region) that comprises four regions (regions A1 to A4) which are point-symmetrical to each other with respect to the light flux center 14, does not include the light flux center 14, and includes part of the dividing line 16 in the X-axis direction; and a divided region (third divided region) that comprises four regions (regions B1 to B4) which are point-symmetrical to each other with respect to the light flux center 14, does not include the light flux center 14, and includes part of the dividing line 15 in the Y-axis direction.

When the optical pickup apparatus is disposed to face the surface of the optical disc during recording or reproducing, the dividing line 15 extends substantially parallel to the track direction of the optical disc, and the dividing line 16 extends substantially perpendicular to the track direction of the optical disc.

The regions A1 to A4 are divided by the dividing line 16 in the X-axis direction passing through the light flux center 14, two dividing lines 17 in the Y-axis that do not pass through the light flux center 14, four dividing lines 18 in the X-axis direction that do not pass through the light flux center 14, and four dividing lines 19 around the light flux center 14 that form angles of 30 degrees with respect to the Y-axis direction. The interval u in the Y-axis direction of the four dividing lines 18 running in the X-axis direction is set to include a push pull pattern in the range of about 55% to 70% of the light flux diameter in the embodiment.

The regions A1 to A4 are disposed to sandwich the regions C1 to C4. The regions A1 to A4 are formed such that the regions A1 and A2 are line-symmetrical to the regions A4 and A3, respectively, with respect to the dividing line 15.

Regions B1 to B4 are also provided to sandwich the regions C1 to C4. The region B1 is provided to be line-symmetrical to the region B2 with respect to the dividing line 16, while the region B4 is provided to be line-symmetrical to the region B3 with respect to the dividing line 16.

The interval w between the two dividing lines 17 running in the Y-axis direction is set to be as small as possible under the condition that the region A includes the push pull pattern and the stray light does not enter the light receiving parts 13 depending on the shape of the light receiving parts 13 of the light detector 12. In the embodiment, it is set within the range of about of 25% to 30% of the light flux diameter. The dividing lines 19 that form angles of 30 degrees with respect to the Y-axis direction are provided to prevent the entry of the stray light into the light receiving parts 13.

The interval v between two dividing lines 20 running in the X-axis direction on the boundary between the region B and region C is set to be as small as possible under the condition that the stray light does not enter the light receiving parts 13 in response to the shape of the light receiving parts 13 of the light detector 12.

The shape of diffraction grating formed on the region C1 is the same as that formed on the region C3, and that formed on the region C2 is the same as that formed on region C4. However, the shapes of diffraction gratings formed on other regions are different with each other. In each diffraction grating, the light flux is divided into plus(+)/minus(−) first-order diffracted light before being irradiated onto the light detector 12.

Figure 3:
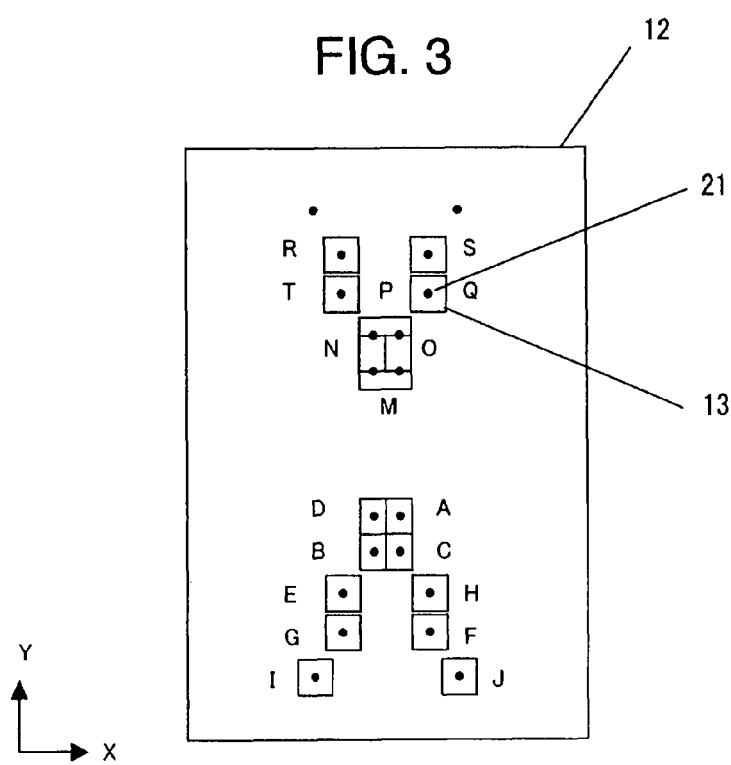
FIG. 3 is a diagram showing a light detector and an light pattern in an embodiment of the present invention.
Figures 4E, 4F:
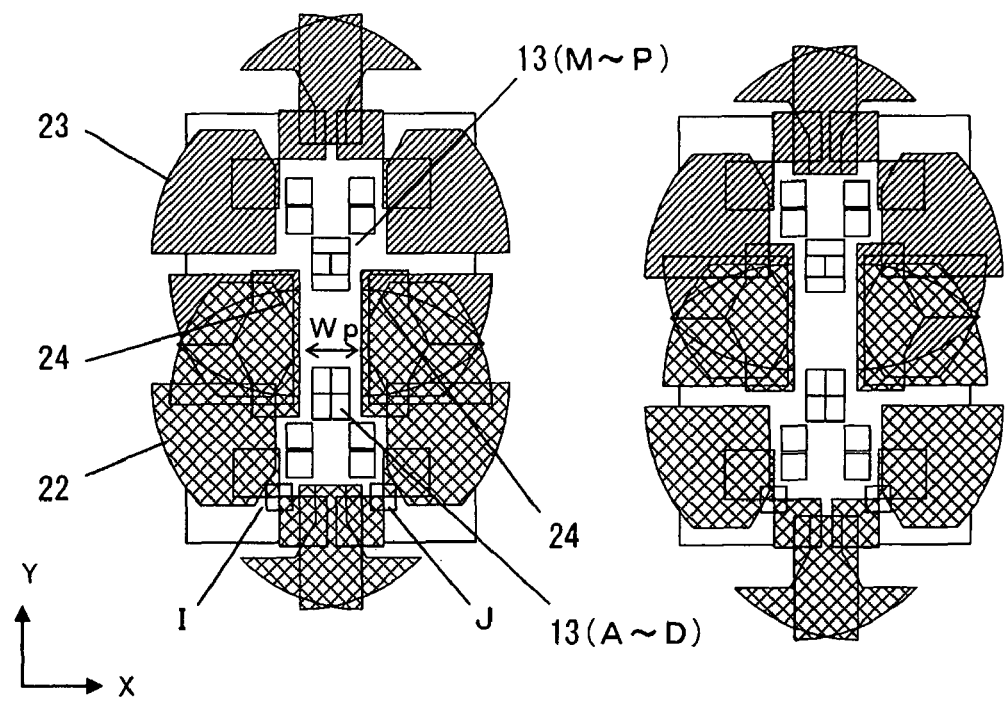
Figure 5A:
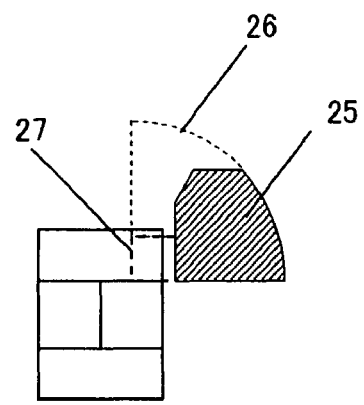
FIGS. 5A to 5E are diagrams showing how light patterns in an embodiment of the present invention change.
Figure 5B:
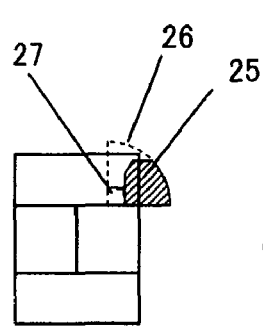
Figure 5C:
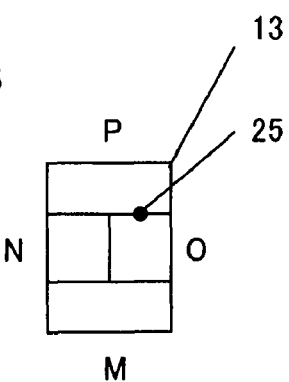
Figure 5D:
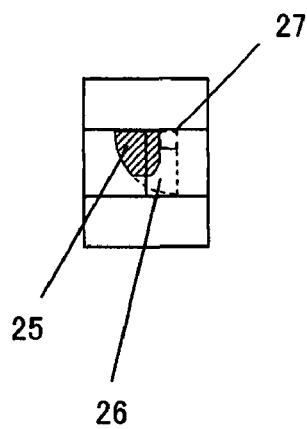
Figure 5E:
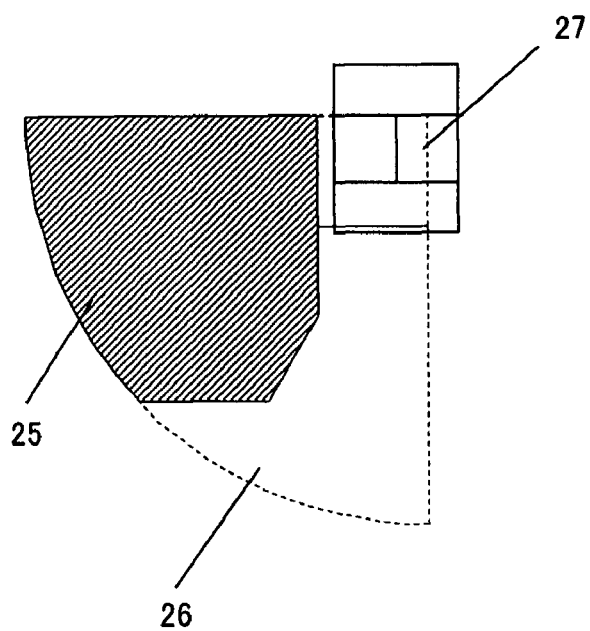

FIG. 3 shows the shape of the light receiving parts 13 of the light detector 12, and the shapes of light patterns irradiated onto the light detector. In FIG. 3, the light pattern of only the reflected light from the recording and reproducing layer is shown, and the light pattern of the stray light from other layer is not shown.

When the recording and reproducing layer is in focus, the laser light reflected from the recording and reproducing layer is focused at a point 21 on the light detector 12, and is irradiated onto the light receiving part 13 comprising 18 light receiving parts of A to J and M to T formed on the light detector 12.

Light receiving parts M, N, O and P detect a focus error signal using a double knife edge method. If the light flux of a plus/minus first-order diffracted light which is diffracted on the region A1 and irradiated onto the light detector 12 is represented as a1+ and a1−, then a light flux a1− is irradiated onto the boundary between the light receiving parts M and N, a light flux a2− is irradiated onto the boundary between the light receiving parts P and O, a light flux a3− is irradiated onto the boundary between the light receiving parts P and N, a light flux a4− is irradiated onto the boundary between the light receiving parts M and O. When the outputs from light receiving parts A to J are represented by a to j, respectively, and the outputs of light receiving parts M to T are represented by m to t, respectively, an focus error signal (FES) is obtained by the following computing equation.

(FES)=$(m+p)-(n+o)$

Light receiving parts E, F, G and H and light receiving parts Q, R, S and T are disposed outside light receiving parts A, B, C and D and light receiving parts M, N, O and P, respectively. The light receiving parts A, B, C and D are irradiated with light fluxes a1+, a2+, a3+ and a4+. The light receiving parts E, F, G and H are irradiated with light fluxes b1+, b2+, b3+ and b4+. The light receiving parts Q, R, S and T are irradiated with light fluxes b1−, b2−, b3− and b4−. They are used for detecting tracking error signals. The outputs of the light receiving parts Q, R, S and T shall be q, r, s and t, respectively.

The tracking error signal (TES) according to the push pull method is obtained by the following computing equation.

(TES)=$((a+e+b+f)-(c+g+d+h)-K((q+r)-(s+t))$ where K is a constant, and the value of K is determined such that an offset does not occur to (TES) when the objective lens 7 moves in the X-axis direction due to a tracking operation.

The tracking error signal (DPD) according to a DPD method is obtained by detecting the phase difference between (a+e, c+g) and (b+f, d+h).

Light receiving parts I and J are disposed outside the light receiving parts E, F, G and H, and the light receiving part I is irradiated with light fluxes c1+ and c3+, while the light receiving part J is irradiated with light fluxes c2+ and c4+. These are combined with other signals and are used for the detection of reproduced signals (RF), which are obtained using the following computing equation.

(RF)=$a+b+c+d+e+f+g+h+i+j$

Light fluxes c1−, c2−, c3− and c4− are irradiated onto the place where the light receiving parts do not exit, and so these signals are not used for the signal detection.

FIGS. 4A to 4F show how the light pattern of each light flux that is irradiated onto the light detector 12 changes during defocusing, and the waveform of the focus error signal (FES). FIGS. 4A to 4C, 4E and 4F correspond to (a) to (e) of FIG. 4D.

The light pattern of a plus first-order diffracted light 22 is shown by a lattice pattern and the light pattern of a minus first-order diffracted light 23 is shown by oblique lines. When the focused focal point is positioned at (c), the light pattern is focused on the boundary of the light receiving parts M to P and at this time the focus error signal becomes 0. As the defocusing increases, the light pattern becomes larger. At (b) or (d), the focus error signal reaches a maximum or minimum value. Moreover, at (a) and (e) where the light pattern becomes even larger, the light receiving parts 13 cease to be irradiated with light, with the focus error signal becoming 0.

As the defocusing increases, the light pattern becomes larger around the focus point (c), and at this time, the light pattern on the regions C1 to C4 also becomes larger. However, the light pattern near the light flux center of the regions C1 to C4 is not included in other regions than the regions of the light receiving parts I and J, thus the light pattern deviating from the light receiving part 13. In the light receiving parts M to P for detecting the focus error signal, as the light pattern from the region B1 to region B4 and from region C1 to region C4 become larger, the light pattern deviates from the light receiving parts M and P.

A detailed description will be given to how the light pattern changes at the light receiving parts M to P for detecting the focus error signal with reference to FIGS. 5A to 5E. FIGS. 5A to 5E show the change of the light pattern of a light flux a2− which is condensed on the boundary between light receiving surfaces O and P during focusing. (b), (c) and (d) correspond to the state shown in FIGS. 4A to 4F, and (a') shows the state in the middle between (a) and (b), and (e') shows the state in the middle between (d) and (e) in FIG. 4D. At (c), a position corresponding to the light flux center 14 is focused and the light pattern 25 expands around the light focus point (light flux center) (c) as the defocusing increases. At this time, since virtual light patterns 26 and 27 corresponding to light fluxes b2− and c2− which are irradiated onto other light receiving parts expand, the light pattern 25 extends off the light receiving parts M to P, and the entire light pattern 25 lies outside the light receiving parts M to P at (a') and (e').

In FIGS. 4A to 4F, the interval Wp between the light patterns of the regions A1 to A4 in the X-axis direction during defocusing is determined in response to the width w between the dividing lines 17 of the polarizing diffraction grating. Therefore, the relation between the shapes of the light receiving parts 13 and the width w of between the dividing lines 17 is determined such that the light patterns are not irradiated onto the light receiving parts 13 during the defocusing.

Since the light receiving parts 13 are disposed on the interval Wp, light receiving parts 13 can be disposed nearer to each other compared with when the light receiving parts 13 are disposed outside the light pattern during defocusing, thus making it possible to reduce the size of the light detector.

Furthermore, if a light pattern of other region is irradiated onto the light receiving parts M to P when the light patterns expand with the increasing focusing, a distortion occurs to the focus error signal waveform, causing an error during focus withdrawal. A shaded area 24 of the region A, which is formed by the dividing line 19 which forms an angle of 30 degrees with respect to the Y-axis direction of the polarizing diffraction grading 5, is provided to prevent the light patterns that are irradiated onto the light receiving parts A to D from entering the light receiving parts M to P when they expand with defocusing. The shaded area becomes unnecessary depending on the deposition of the light receiving parts.

Figure 6A:
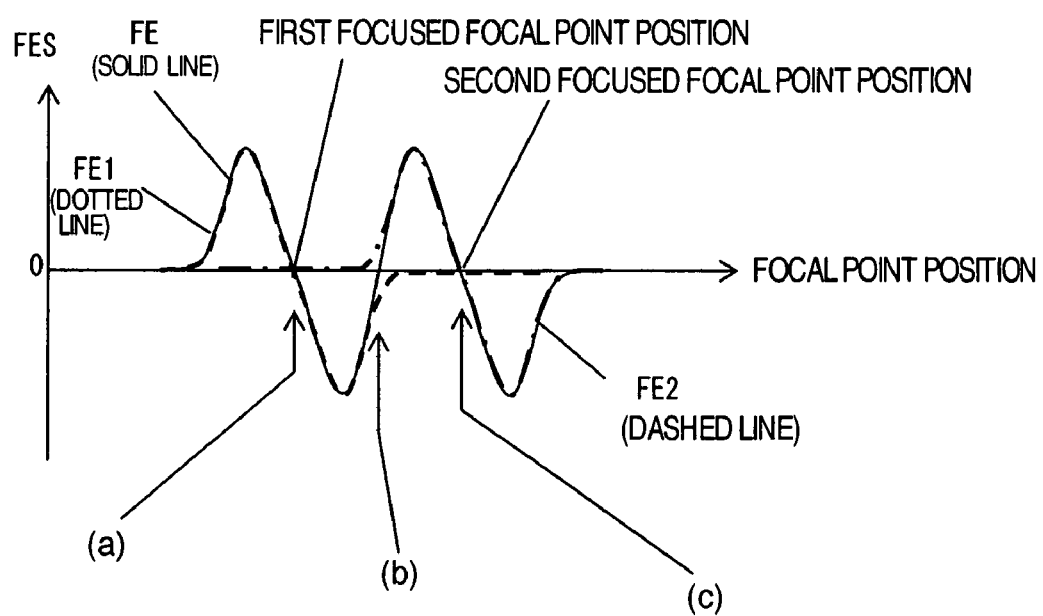
FIGS. 6A to 6E are diagrams showing the shapes of light patterns on a two-layer disc in an embodiment of the present invention.
Figure 6B:
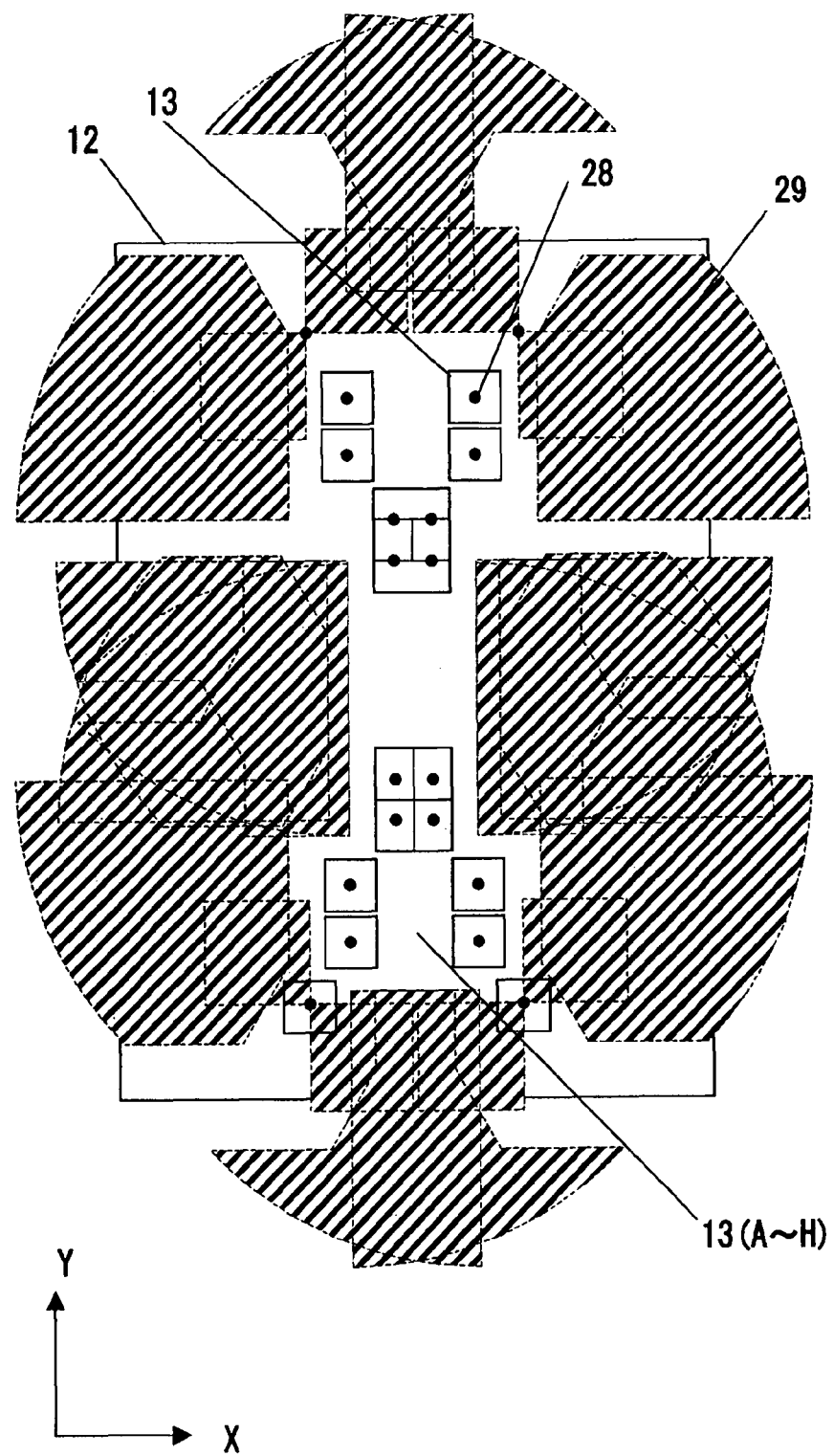
Figure 6C:
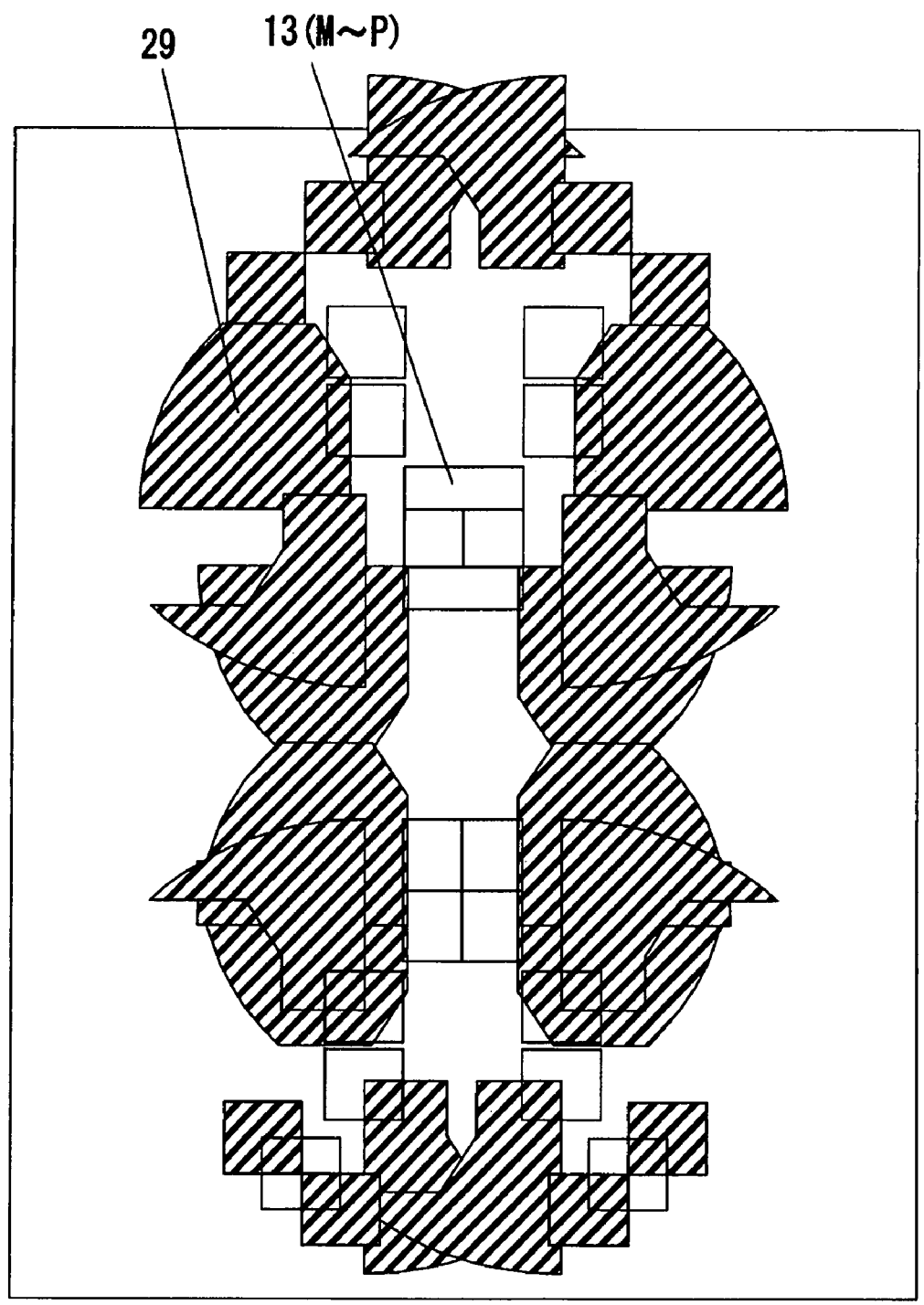
Figure 6D:
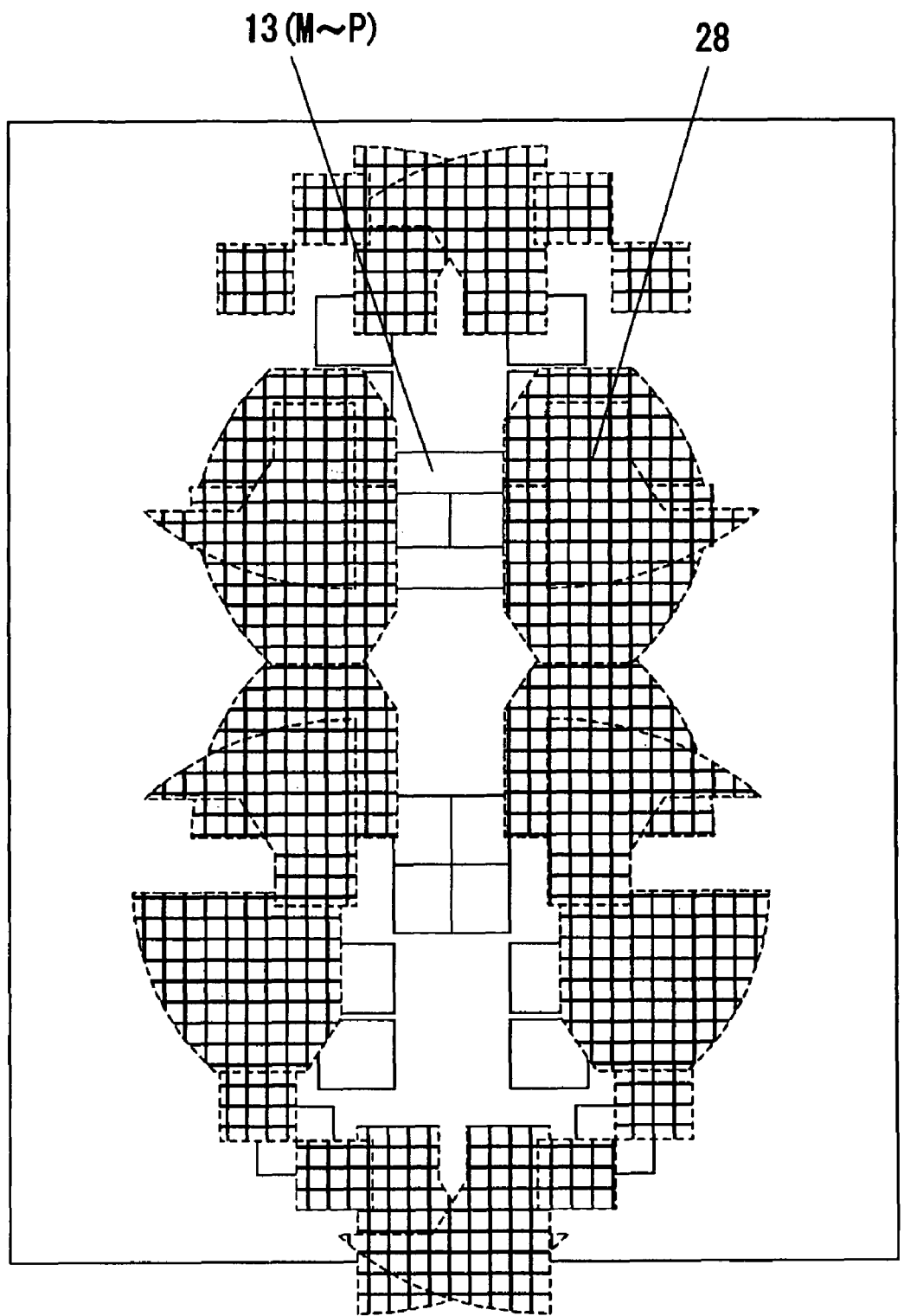
Figure 6E:
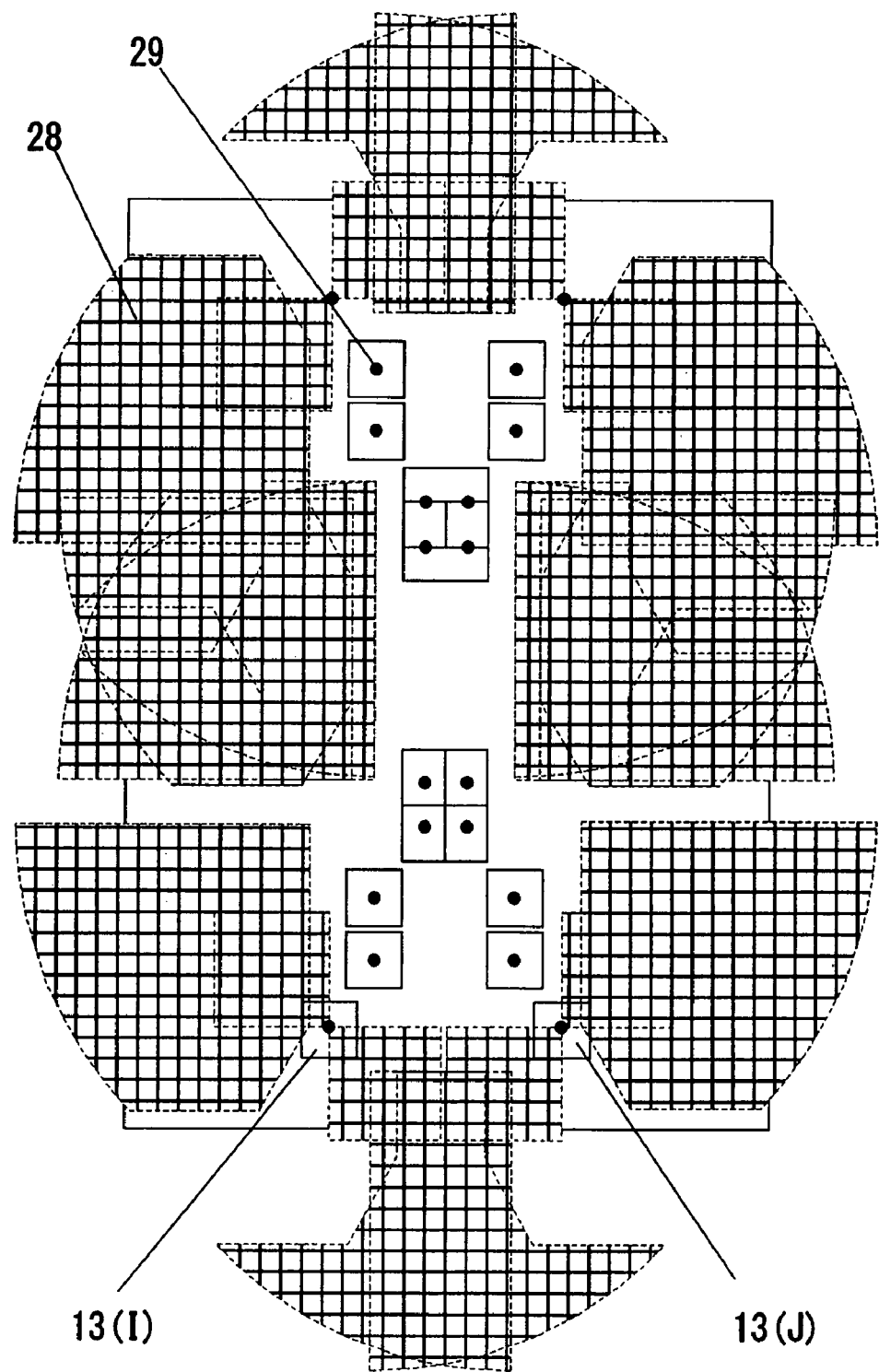

FIGS. 6A to 6E show the shapes of light patterns on the light detector 12 when the disc comprises of two layers, and the waveform of a focus error signal (FES). A light pattern 28 reflected from the first layer 9 is shown by a lattice pattern, while the light pattern reflected from the second layer 10 is shown with oblique lines. FIG. 6B corresponds to (a) of FIG. 6A. FIGS. 6C and 6D correspond to (b) of FIG. 6A. FIG. 6E corresponds to (c) of FIG. 6A.

The focus error signal waveform (FE) of the two-layer disc is obtained by combining a focus error signal waveform (FE1) generated at the first layer 9 and a focus error signal waveform (FE2) generated at the second layer 10. FIG. 6B shows the shapes of light patterns 28 and 29 when the first layer 9 is in focus, wherein the light pattern 28 is focused on the light detector 12, and the light pattern 29 (stray light) is irradiated onto the outside of the light receiving parts 13 at that time.

As the focus shifts from the first layer 9 to the second layer 10, the size of the light pattern 28 increases, while the size of the light pattern 29 diminishes. At the midpoint (b) between the first layer 9 and second layer 10, the size of the light pattern 28 and that of light pattern 29 are substantially the same as FIGS. 6C and 6D show, and most of them are not irradiated onto the light receiving parts M to P. At (c) where the second layer 10 is in focus, the light pattern 29 is focused onto the light detector 12, and the light pattern 28 (stray light) is irradiated onto the outside of the light receiving parts 13.

While the focus error signal is obtained by computing the outputs of the light receiving parts M to P, the stray light is not irradiated on the light receiving parts M to P when the second layer 10 is in focus. Therefore, an offset due to the stray light does not occur there. In addition, the offset due to the stray light does not occur even if the intensity distribution of a laser light 2 varies and the light pattern is displaced from the light receiving parts 13, thus making it possible to obtain a stable focus error signal.

Furthermore, if the waveform (FE1) generated at the first layer 9 overlaps a large part of the waveform (FE2) generated at the second layer 10, a distortion occurs to the focus error signal waveform (FE) of the second disc, and sometimes a focus withdrawal error can occur. However, in the embodiment, since the light pattern is hardly irradiated onto the light receiving parts M to P at a location near the midpoint between the first layer 9 and the second layer 10, the outputs of the (FE1) and (FE2) are small and thereby distortion experienced by the focus error signal waveform (FE) is also small.

By the same token, while a tracking error signal is obtained by computing the outputs of the light receiving parts A to H and Q to T, the stray light is not irradiated onto the light receiving parts A to H and Q to T when the layer is in focus, thus making it possible to obtain a stable focus error signal in which an offset due to the stray light does not occur.

Since the light receiving parts I and J include the light flux center, a light near the light flux center remains at the light receiving parts and becomes a stray light even if the light patterns expand. However, this portion is not used for detecting the focus error signal and a tracking error signal, and is used only for detecting a reproducing signal. Therefore, the existence of the stray light causes no problem in practical use.

Since there is no influence from the stray light as described above, it is possible to change the balance of light amount of plus/minus first-order diffracted light which is diffracted at the polarizing diffraction grating 5. It is possible to improve the SN of a reproduced signal by increasing the light amount of the plus first-order diffracted light 22 such that the light amount of the light receiving parts for detecting the reproduced signal increases. At this time, while the minus first-order diffracted light 23 decreases, the offset due to the stray light does not increase because of the reduction in the light amount. Therefore, only electrical restriction has to be considered.

In the present embodiment, the polarizing diffraction grating 5 and one-quarter wave plate 6 may be fixed in one piece with the objective lens 7 such that they operate together with the objective lens 7. Alternatively, they may separately be fixed so that they do not operate together with the objective lens 7. In the case where the polarizing diffraction grating 5 and one-quarter wave plate 6 are fixed separately from the objective lens 7, when the objective lens 7 moves in the X direction due to the tracking operation, the outside shape of the light flux, which is shown by an alternate long and two short dashes line in FIG. 2, also moves in the X direction, and the dividing line 15 lies off the light flux center 14. However, the position and size of the light pattern interval Wp that appears on the light detector 12 in response to the width w between the dividing lines 17 do not change. Therefore, the stray light is not irradiated onto the light receiving parts 13 either in this case. Since the outside shape of the light flux moves in the X direction, the value of K in the computing equation of the tracking error signal (TES) according to the push pull method differs from that when they are fixed in one piece with the objective lens 7.

The polarizing diffraction grating 5 is not limited to the shape shown in the above embodiment. Other embodiments of the polarizing diffraction grating will be described below.

Embodiment 2

Figure 7:
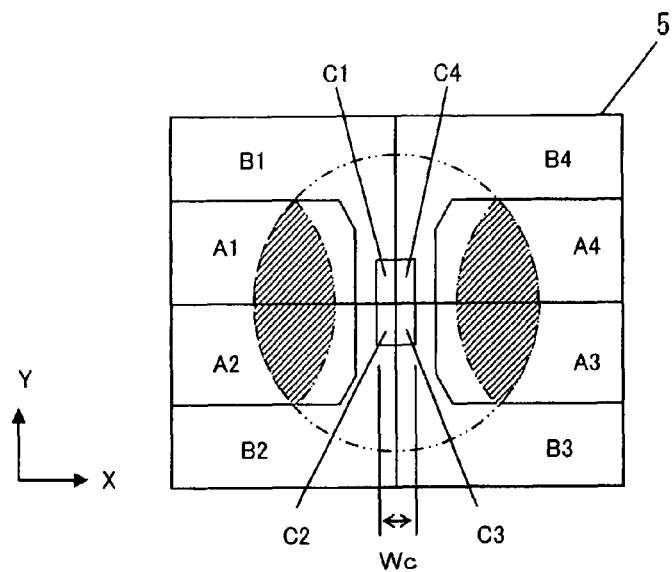
FIG. 7 is a diagram showing an embodiment 2 of the polarizing diffraction grating in the present invention.
Figure 8:
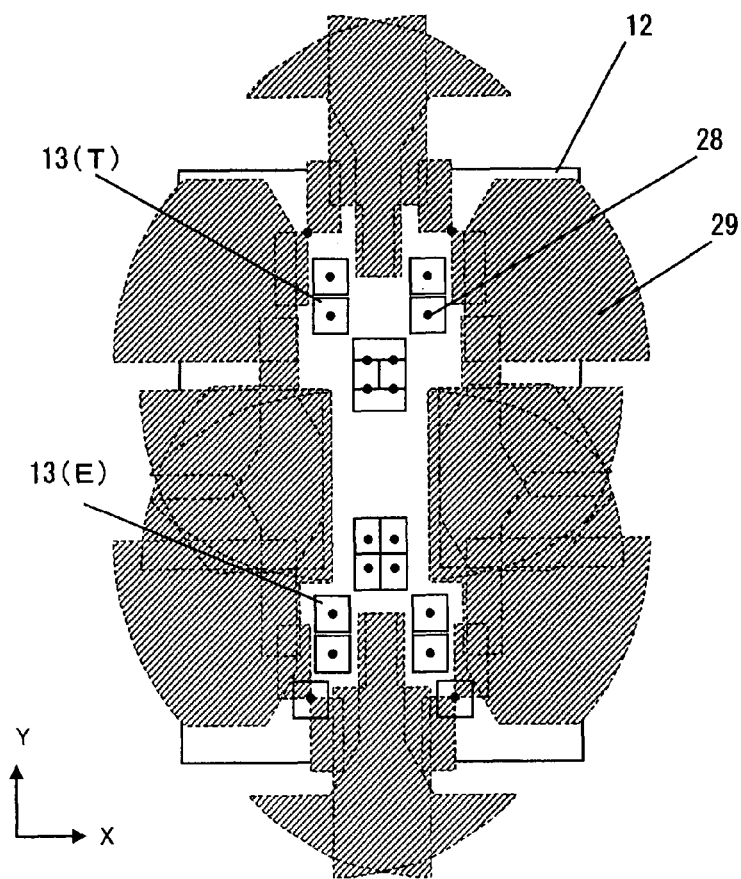
FIG. 8 is a diagram showing the shape of light patterns of the embodiment 2 of the polarizing diffraction grating in the present invention.

FIGS. 7 and 8 show the shapes of divided regions of the polarizing diffraction grating 5 in an embodiment 2 and the shapes of light patterns irradiated onto the light detector 12 at that time. The light pattern 28 of the reflected light from the first layer 9 is focused on the light detector 12, and the light pattern 29 (stray light) of the reflected light from the second layer 10 at that time is shown by oblique lines. A difference from the embodiment 1 is that the width Wc of the regions C1 to C4 in the X-axis direction is narrower. The regions B1 to B4 are larger by just that much. The shapes of the regions A1 to A4 are the same as those of the embodiment 1. Since the regions B1 to B4 are larger, the stray light is more likely to enter the light receiving parts E to F and Q to T when the light detector 12 is displaced. However, an effect is expected that increases the output of the tracking error signal.

Embodiment 3

Figure 9:
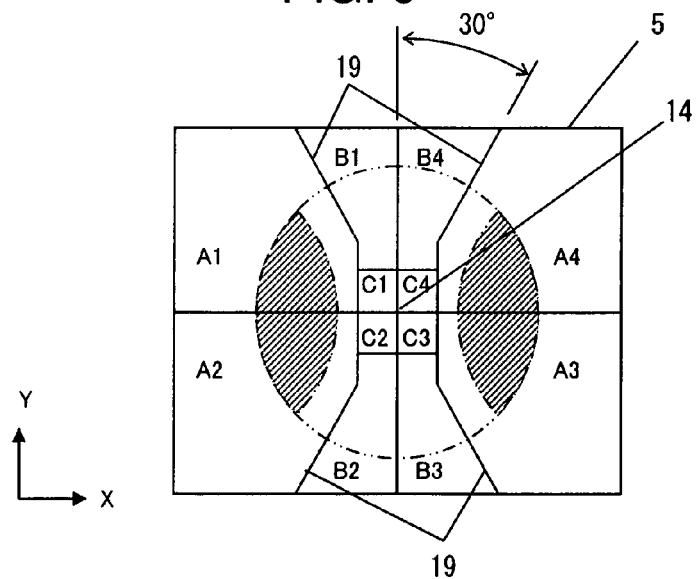
FIG. 9 is a diagram showing an embodiment 3 of the polarizing diffraction grating in the present invention.
Figure 10:
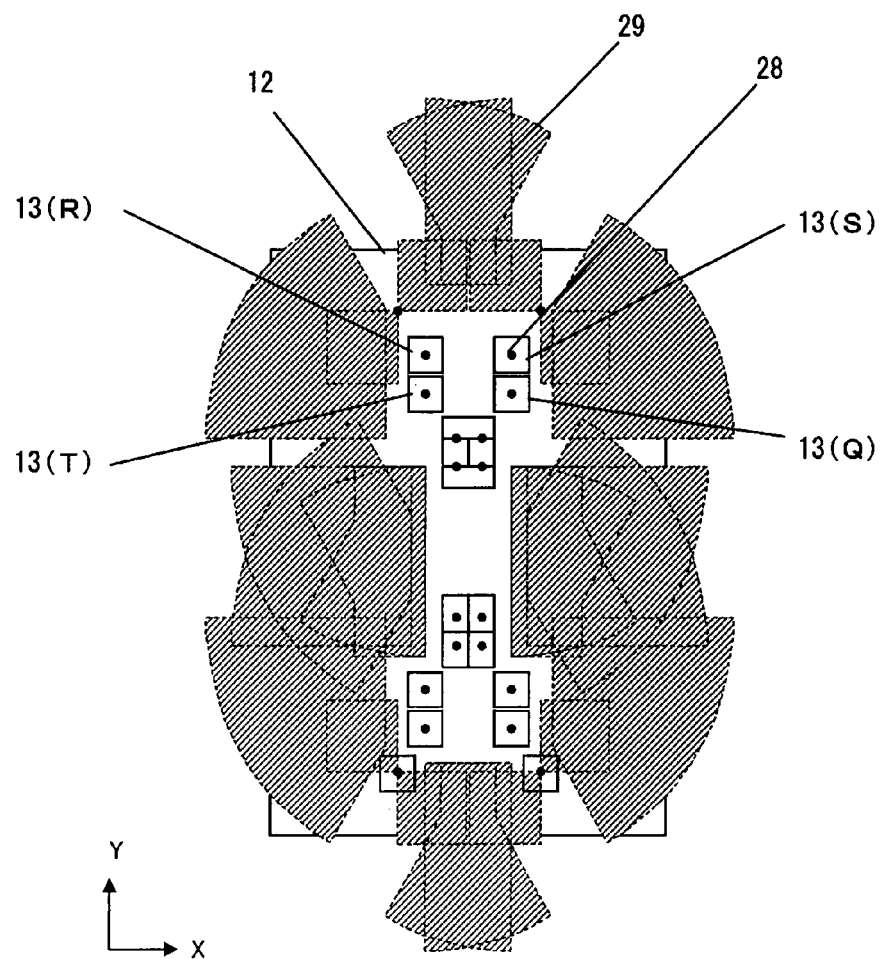
FIG. 10 is a diagram showing the shape of light patterns of the embodiment 3 of the polarizing diffraction grating in the present invention.

FIGS. 9 and 10 show the shapes of divided regions of the polarizing diffraction grating 5 in an embodiment 3 and the shapes of light patterns irradiated onto the light detector 12 at that time. The light pattern 28 of the reflected light from the first layer 9 is focused on the light detector 12, and the light pattern 29 (stray light) of the reflected light from the second layer 10 at that time is shown by oblique lines.

A difference from the embodiment 1 is that there are not the four dividing lines 18 in the X-axis direction that do not pass through the light flux center 14, and the four dividing lines 19 that form an angle of 30 degrees with respect to the Y-axis direction extend longer around the light flux center 14. Therefore, the areas of the region B1 to B4 are reduced, and thereby the outputs of the light receiving parts Q to T are reduced. Accordingly, it is necessary to increase the value of K in the following computing equation for the tracking error signal according to the push pull method.

$$(TES) = ((a+e+b+f) - (c+g+d+h)) - K((q+r) - (s+t))$$

However, since the areas of regions A1 to A4 increase, an effect is expected that increases the output of the error focus signal.

In above embodiment, the polarizing diffraction grating, as a light flux dividing element, is disposed between the collimate lens and one-quarter wave plate. However, an ordinary diffraction grating may be disposed between a polarizing beam splitter and the light detector.

Application can be expected for the optical disc apparatus that records and reproduces information on and from an optical disc.

When a target layer of the optical disc is in focus, the stray light from other layer deviates from the light receiving parts for a servo signal of the light detector. Therefore, it is possible to receive only reflected light from the target layer to obtain the servo signal, thus making it possible to obtain a stable focus error signal and a tracking error signal free of the offset due to the stray light.

Next, the optical disc apparatus equipped with the optical pickup apparatus according to the present invention will be described.

Figure 11:
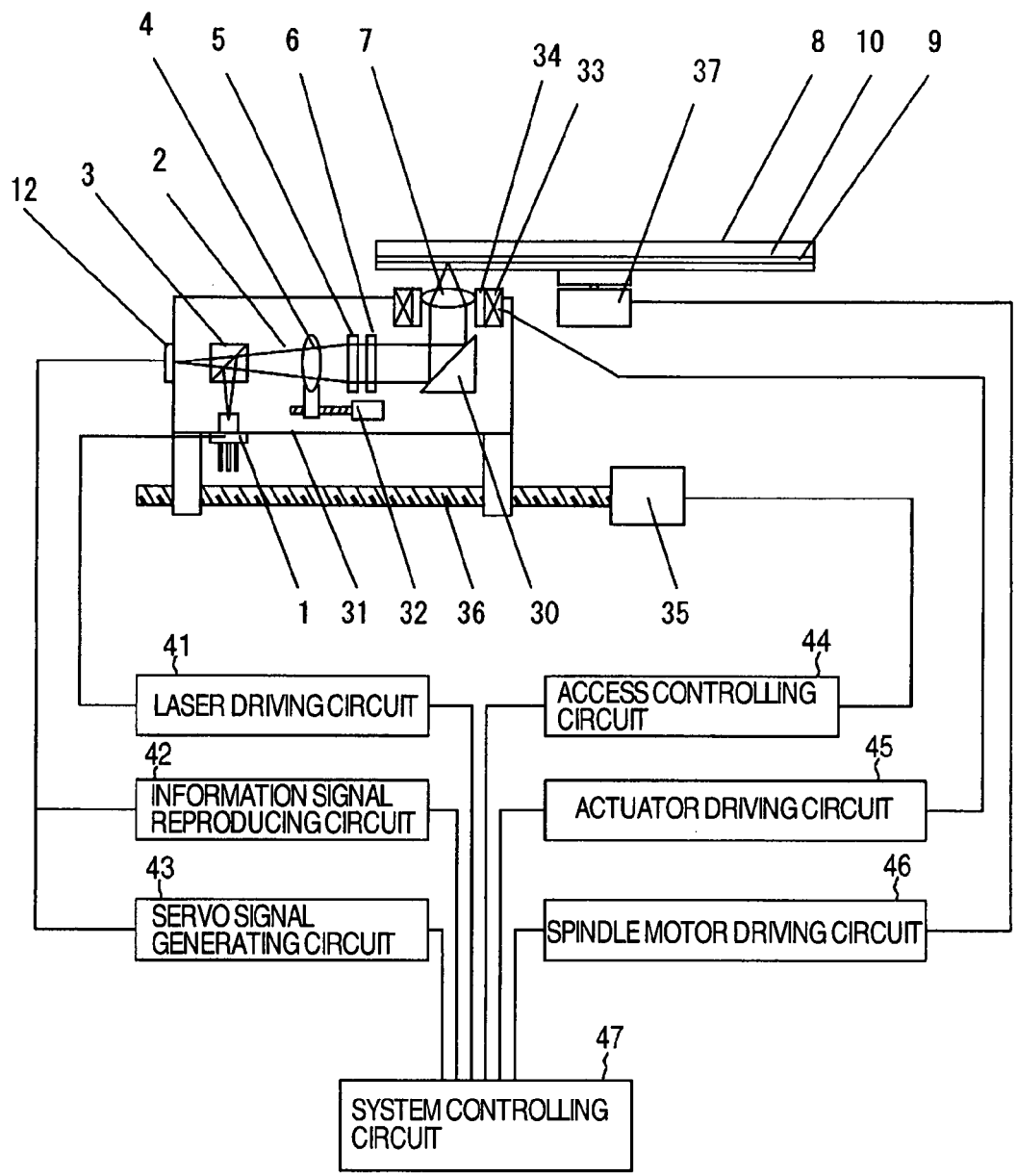
FIG. 11 is a schematic diagram of the optical disc apparatus equipped with the optical pickup apparatus according to the present invention.

FIG. 11 shows a schematic diagram of a specific example of the optical disc apparatus equipped with the optical pickup apparatus shown in FIG. 1. A semiconductor laser 1, a polarizing beam splitter 3, a polarizing diffraction grating 5, a one-quarter wave plate 6 and a light detector 12 corresponding to those shown in FIG. 1, and a mirror 30 for changing the direction of the laser light, which is not shown in FIG. 1, are bonded and fixed to a case 31. A collimate lens 4 is fixed to the case 31 such that it can be moved along the optical axis by a motion mechanism 32. The collimate lens 4 can move to a position where the spherical aberration of a laser light 2, which is focused on a light disc 8, becomes minimal in each of the cases where recording and reproducing are preformed on a first layer 9 and on a second layer 10 of the optical disc 8.

An objective lens 7 is attached to a holder 34 in which a coil 33 is incorporated, and is combined with a magnet, which is not shown, to form an actuator. The objective lens 7 can follow the side-runout and decentering of the optical disc 8.

The case 31 can be moved in the radial direction of the optical disc 8 by a motor 35 and a lead screw 36. The optical disc 8 is fixed to a spindle motor 37.

The operation of each component is controlled by a system control circuit 47. When recording or reproducing is performed, the spindle motor 37 is first driven by the operation of a spindle motor driving circuit 46, and then the optical disc 8 is rotated.

Next, the semiconductor laser 1 is radiated by the operation of a laser driving circuit 41.

Focusing control is performed such that a servo signal generating circuit 43 generates a focus error signal from the output of the light detector 12, an actuator circuit 45 drives the actuator based on the focus error signal, and the objective lens 7 focuses the laser light on the recording and reproducing layer.

When locating the focus point of the laser light 2 on the first layer 9, the focus error signal is detected after the collimate lens 5 is moved to a position corresponding to the first layer 9. Waveforms shown in FIGS. 6A to 6E are obtained to the focus error signal. Therefore, focusing control is performed such that the focus point is located on the first layer.

Next, an access control circuit 44 is operated to rotate the motor 35, and the case 31 is moved to a desired position on the inner periphery or outer periphery of the optical disc through the lead screw 36.

Then, tracking control is performed in which the actuator circuit 45 drives the actuator based on the tracking error signal generated by the servo signal generating circuit 43 from the output of the light detector 12 to follow the focus point of the laser light 2 on the track of the optical disc 8.

Then, data on the track of the optical disc 8 is reproduced from the output of the light detector 12 by an information signal generating circuit 42.

When information is recorded on the optical disc 8, a laser driving circuit 41 is operated by the system control circuit 47 in response to the information to be recorded, and a record mark is formed on the track by modulating the output of the semiconductor laser 1.

When moving the recording and reproducing layer from the first layer 9 to the second layer 10, the focus point of the laser light 2 is moved towards the second layer by stopping the focusing control and operating the actuator driving circuit 45 at the same time after the tracking control 45 is stopped by the system control circuit 47. Then, the focusing control is performed such that the actuator is driven at the timing that the focus point position of the second layer of the focus error signal is detected and the focus point of the laser light is located on the second layer. Then, the tracking control is performed in which after the collimate lens 4 is moved to a position corresponding to the second layer 10, the actuator is driven based on the tracking error signal to follow the focus point of the laser light 2 on the track. The reproducing operation and recording operation are performed on the second layer 10 in the same way as on the first layer 9.

While the polarizing diffraction grating 5 and one-quarter wave plate 6 are fixed to the case 31 in the above embodiment, they may be fixed to the holder 34, to which the objective lens 7 is fixed, such that they move together with the objective lens 7.

While the optical pickup apparatus and optical disc apparatus equipped with the same according to the present invention have been described in detail by way of embodiments thereof in the above, the present invention is not limited to the above embodiments. The present invention can include various variations and improvements without departing from the spirit of the present invention.

For example, while recording or reproducing on or from the optical disc in which two layers of recording and reproducing layer (information recording layer) are laminated in the above embodiments, the present invention is also adaptable to recording or reproducing on or from an optical disc in which three layers or more of recording and reproducing layer are laminated.

Furthermore, the disposition pattern of light receiving parts of the light detector is not limited to the above examples. The light receiving parts may be disposed in any way unless a reflected light flux from other recording and reproducing layer than the target recording and reproducing layer is not irradiated onto the light receiving parts of the light detector when the target information recording layer of the optical disc is in focus.

In addition, while the first divided region comprises four regions of C1 to C4 in the above embodiments, the present invention is not limited to the same. The first divided region may comprise only one region, two regions, or four or more regions.

Next, embodiments of the optical pickup apparatus according to the present invention will be described.

Embodiment 4

Figure 12:
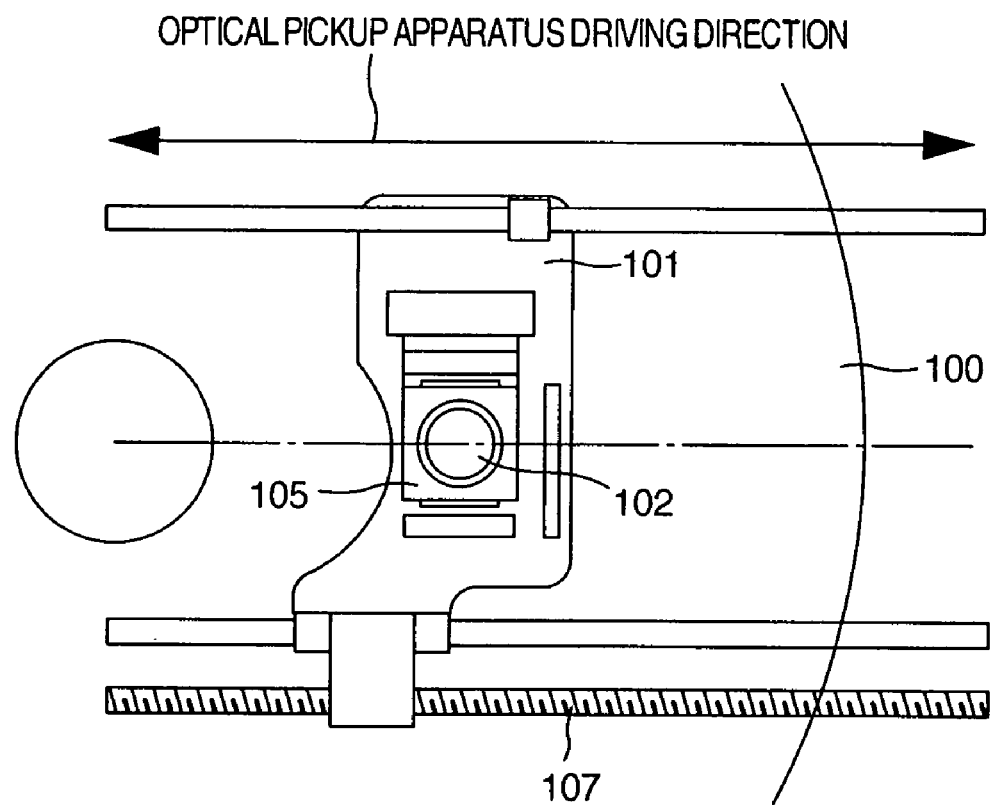
FIG. 12 is a diagram explaining the disposition of an optical pickup apparatus and an optical disc apparatus in an embodiment 4.

FIG. 12 is a schematic diagram showing an exemplary optical pickup apparatus according to the present invention.

The optical pickup apparatus 101 is structured such that it can be driven by a drive mechanism 107 in the radial direction of the optical disc 100 as is shown in FIG. 12. An actuator 105 on the optical disc 100 is equipped with an objective lens 102. The optical disc 100 is irradiated with light by the objective lens 102. The light emitted from the objective lens 102 forms a spot on the disc and is reflected from the disc. A focus error signal and a tracking error signal are generated by detecting the reflected light.

Figure 13:
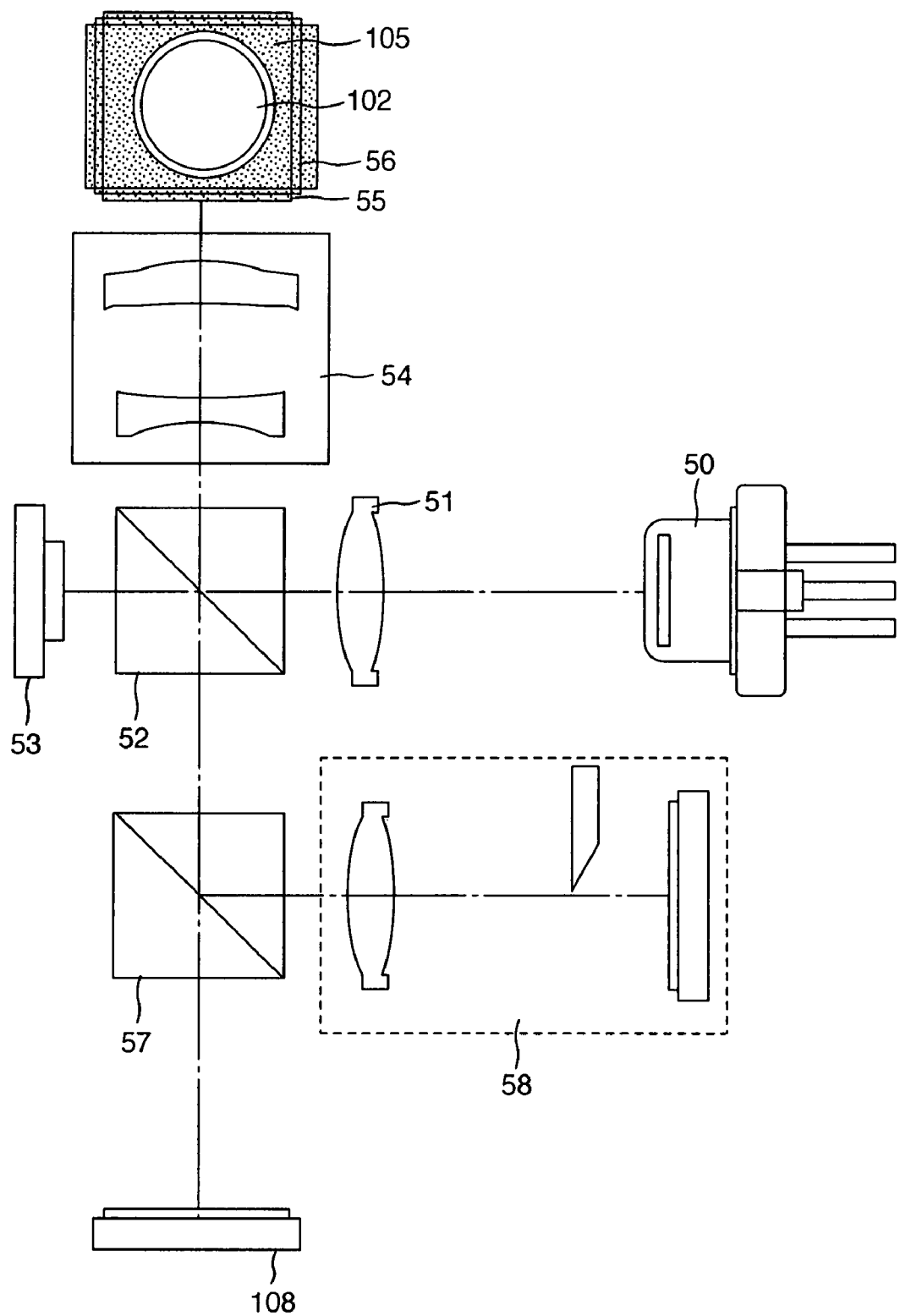
FIG. 13 is a diagram explaining an optical pickup apparatus using a one beam method in the embodiment 4.

FIG. 13 shows an optical system for the above optical pickup apparatus. While BD will be described here, HD-DVD and other recording methods are also adaptable.

A light flux with a wavelength of about 405 nm is emitted from a semiconductor laser 50 as a divergent light. The light flux emitted from the laser 50 is converted by a collimate lens 51 into a substantially parallel light. The light flux that passes through the collimate lens 51 is reflected by a beam splitter 52. Part of the light flux passes through the beam splitter 52 to enter a front monitor 53. Generally, when information is recorded on a recording type optical disc such as RD-RE or BD-R, a given amount of light is irradiated onto the recording surface of the optical disc with. Therefore, it is necessary to highly precisely control the light amount of the semiconductor laser. For the purpose, the front monitor 53 detects a change in the light amount of the semiconductor laser 50 when information is recorded on the recording type optical disc, and feeds back the result to the a drive circuit (not shown) of the semiconductor laser 50. This enables monitoring the light amount on the optical disc.

The light flux reflected from the beam splitter 52 enters a beam expander 54. The beam expander 54 has a function to change the diverging or converging state of the light flux. Therefore, the beam expander 54 is used for compensating the spherical aberration due to an error in thickness of a cover layer of the optical disc 100. The light flux emitted from the beam expander 54 is reflected by a start-up mirror 55 and passes through a one-quarter wave plate 56, and thereafter the light flux is focused on the optical disc 100 by the objective lens 102 mounted on the actuator 105.

The light flux reflected by the optical disc 100 passes through the objective lens 102, one-quarter wave plate 56, start-up mirror 55, beam expander 54 and beam splitter 52. The light flux passing through the beam splitter 52 is separated into a light flux passing through a beam splitter 57 and a light flux reflected by the beam splitter 57.

A focus error signal is detected from the light flux reflected by the beam splitter 57 according to a knife edge method. It should be noted that the knife edge method is used here as a focus detecting method, but not limited to the knife edge method. Since the knife edge method is publicly known, its description is omitted here. After passing through the beam splitter 57, the light flux enters a light detector 108. The light detector 108 detects a signal on the disc and a tracking error signal.

Figure 14:
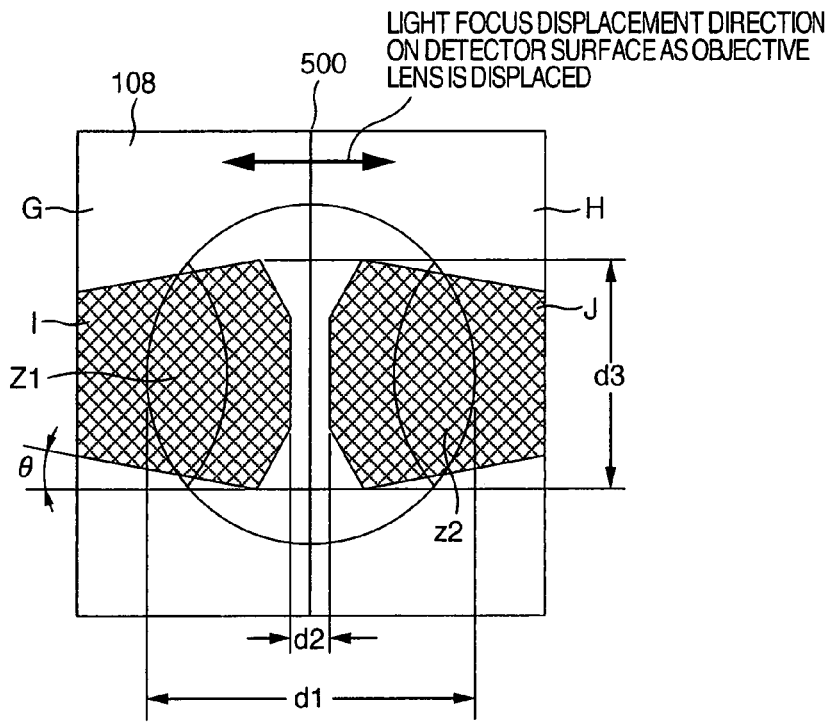
FIG. 14 is a diagram explaining a light receiving part or a polarizing diffraction grating of the embodiment 4 in the present invention.

FIG. 14 shows a pattern of a light receiving part 108 according to the present invention. The light receiving part 108 comprises four regions of a region I (region 1), a region J (region 2), a region G (region 3) and a region H (region 4). The region I (region 1) and region G (region 3) are line-symmetrical to the region J (region 2) and region H (region 4) with respect to the center line of the light receiving part. In addition, the region I (region 1) and region J (region 2) are characterized in that their widths in the central axis 500 direction become narrower with the distance away in the direction substantially perpendicular to the central axis 500 from the central axis (or center line) 500.

Here, the principle of detecting a tracking error signal of the one beam method will be described with reference to FIG. 14. On the detector surface, there appears a region where a 0th-order diffracted light and a plus/minus first-order diffracted light interfere with each other. The interfering state of the regions differs depending on the spot positions on the track. Therefore, this can be used to dispose a spot on a desired track position. Actually, a push pull signal is generated by computing the difference between a signal obtained at an interference region Z1 of the 0th-order diffracted light and plus first-order diffracted light, and a signal obtained at an interference region Z2 of the 0th-order diffracted light and minus first-order diffracted light. The signal in the regions other than the interference hardly depends upon the positions of the spot on the track. The one beam method uses this characteristic.

Figure 15:
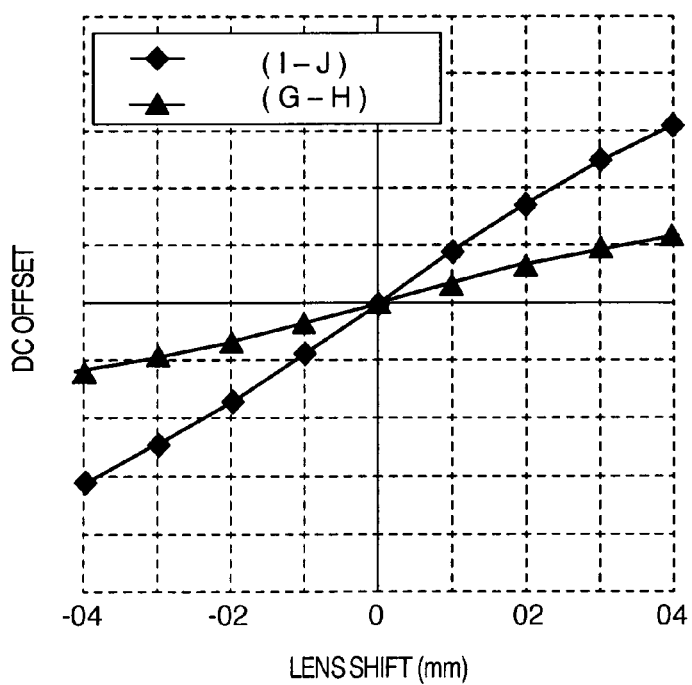
FIG. 15 is a diagram explaining the DC offset when the objective lens of FIG. 12 is displaced on the inner and outer periphery.

The foregoing will be described in detail hereinafter. The light flux is displaced on the light receiving part in the arrow direction of FIG. 14 with the displacement of the objective lens, and intensity distribution is also displaced in the same direction at the same time. A DC offset occurs to the signal of (I-J) due to the two effects. The DC offset also occurs to the signal of (G-H). FIG. 15 shows the amount of offset of the (I-J) signal and (G-H) signal relative to the amount of displacement of the objective lens. It is known from FIG. 15 that the amount of DC offset occurring to the (I-J) signal and (G-H) signal relative to the displacement of the objective lens is nearly linear. Therefore, it is known that a tracking error signal in which DC offset is suppressed can be detected by performing the following computation.

(Tracking error signal)=$(I-J)-k \cdot (G-H)$ (equation 1)

where k is a coefficient for correcting the DC offset of the (I-J) signal and DC offset of the (G-H) signal. In this manner, the one beam method enables the detection of the tracking error signal in which offset is suppressed.

Figure 16A:
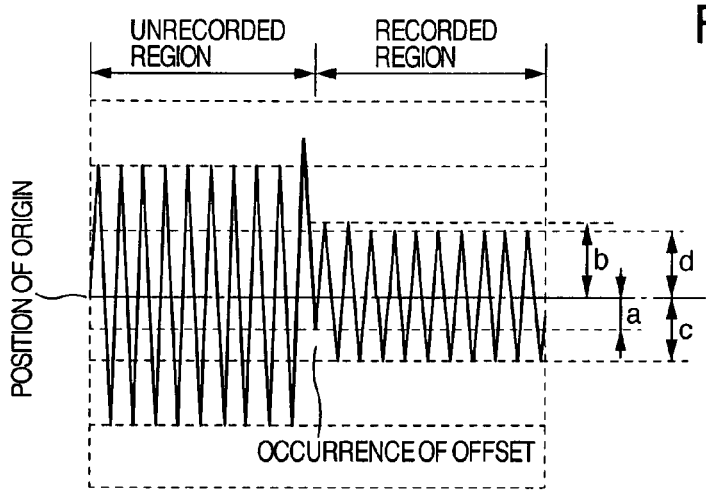
FIGS. 16A to 16C are diagrams schematically explaining the offset occurring at the boundary between an recorded region and a recorded region in the one beam method of the embodiment 4.
Figure 16B:
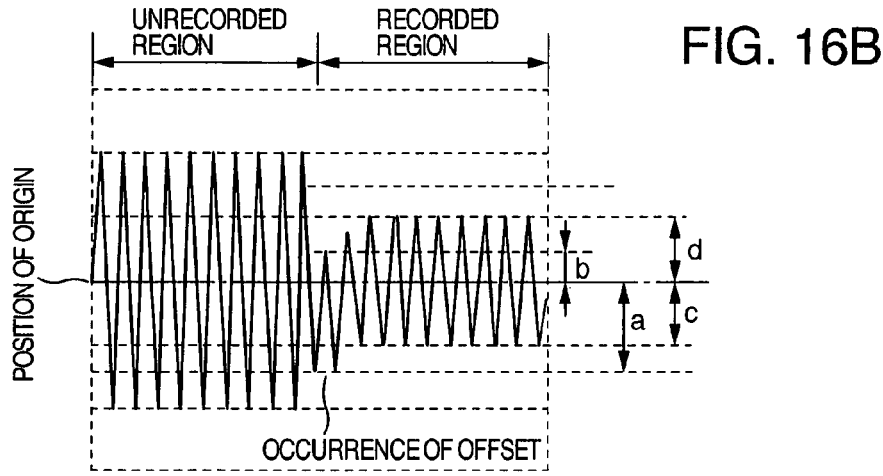
Figure 16C:
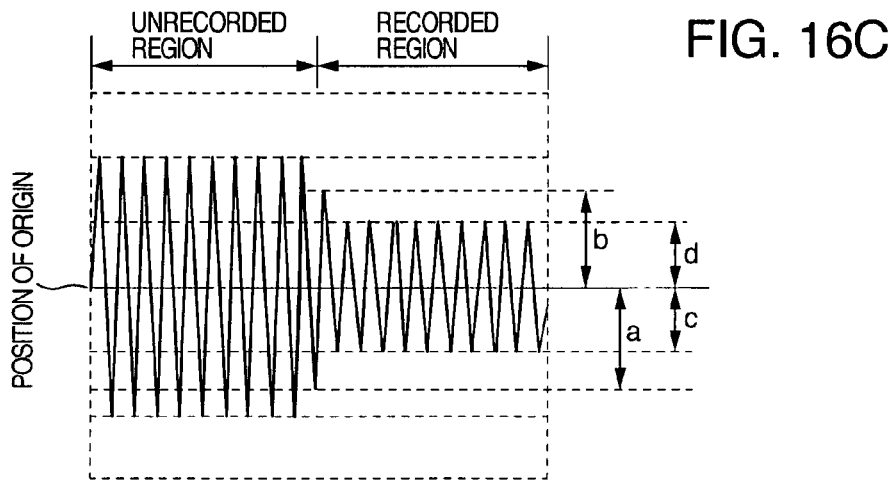

Next, description will be made to the offset of a tracking error signal occurring at the boundary between an unrecorded region and a recorded region on the disc. FIGS. 16A to 16C schematically show the waveform of a tracking error signal according to the one beam method at the boundary between the unrecorded region and recorded region. FIG. 16A shows when the offset can not be suppressed. FIG. 16B shows when the offset occurs on the reverse side due to overcorrection. FIG. 16C shows a tracking error signal in which the offset is suppressed.

In the waveforms of the tracking error signals shown in FIGS. 16A and 16B, the tracking error signals are more likely not to cross the original point position due to variations or the like. If the tracking error signal does not cross the original point position, it is a problem in terms of servo control. (Tracking control is performed by performing the servo control at the original point position). Therefore, it is evident that the waveform shown in FIG. 16C is desirable.

Here, the bottom ratio and top ratio are considered as an indicator for the offset in the tracking error signal. The bottom ratio is assumed to be (a−c)/(c+d) as shown in FIGS. 16A to 16C. This indicates that, the difference is first obtained between a tracking error signal bottom value in the recording region and a tracking error signal bottom value at the boundary between the unrecorded region and recorded region, and then the difference is divided by the tracking error signal amplitude in the recorded region. Specifically, it indicates how much bottom lies in the lower side when compared with the tracking error signal amplitude in the recording region. In contrast, the top ratio is assumed to be (b−d)/(c+d). This indicates that the difference is first obtained between a tracking error signal top value in the recording region and a tracking error signal top value at the boundary between the unrecorded region and recorded region, and then the difference is divided by the tracking error signal amplitude in the recorded region. Specifically, it indicates how much top lies in the upper side when compared with the tracking error signal amplitude in the recording region.

If the two indicators are positive values, the tracking error signal amplitude gradually changes even if a spot shifts from the unrecorded region to the recorded region, and thereby the servo control stabilizes as is known from FIG. 16C. However, if one indicator is a positive value and the other one is a negative value, the offset can not suppressed, posing a problem. The DC offset also occurs to the tracking error signal when the objective lens is displaced in the tracking direction. Accordingly, the offset due to the boundary between the unrecorded region and recorded region and to the displacement of the objective lens must be suppressed simultaneously.

The evaluation of the offset of the tracking error signal that occurs at the boundary between the unrecorded region and recorded region when the objective lens is displaced will be performed based on the above indicators in the following sections. Here, the calculation conditions when performing simulation are as follows.

wavelength: 405 nm objective lens NA: 0.85 track pitch: 0.32 μm objective lens focal length: 1.41 mm

Figure 17A:
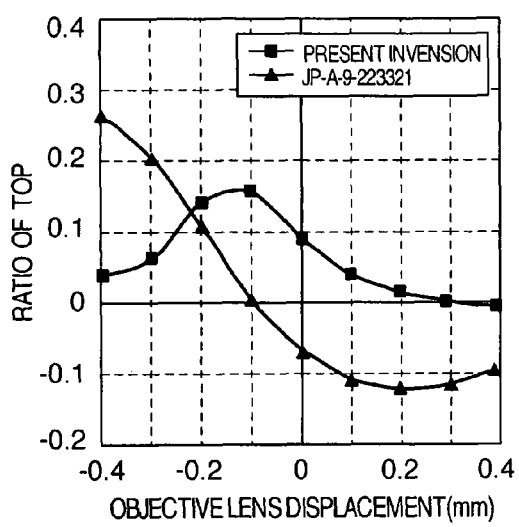
FIGS. 17A and 17B are diagrams comparing the characteristic of the unrecorded region and recorded region in the embodiment 4 with JP-A-9-223321.
Figure 17B:
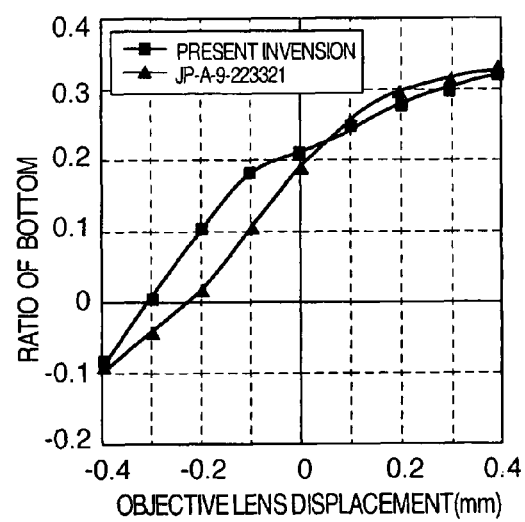

FIG. 17A shows the ratio of top when the objective lens is displaced in the tracking direction while the light receiving parts of the present invention and JP-A-9-223321 are used. FIG. 17B shows the ratio of bottom in the same situation. The conditions of the light receiving parts of the present invention are as follows. $t1=d2/d1=0.19$, where $t1$ is the ratio of the interval between the region I (region1) and region J (region 2) relative to the diameter of the light flux incident to the detector. $t2=d3/d1=0.5$, where $t2$ is the ratio of the maximum width of the region I (region 1) and region J (region 2) in the center axis direction relative to the diameter of the light flux incident to the detector. The slope angle θ of the outside shape of the region I (region 1) and region J (region 2) with respect to the direction perpendicular to the center axis is assumed to be 10 degrees.

FIGS. 17A and 17B show that the top ratio assumes negative values at most of the objective lens displacement amount in the case of JP-A-9-223321. In addition, FIGS. 17A and 17B show that the bottom ratio assumes positive values. This indicates that the offset is occurring.

In contrast, in the case of the present invention, both the top ratio and bottom ratio are positive in most of the objective lens displacement amount, indicating that the offset at the boundary between the recorded region and unrecorded region is suppressed.

Figure 18A:
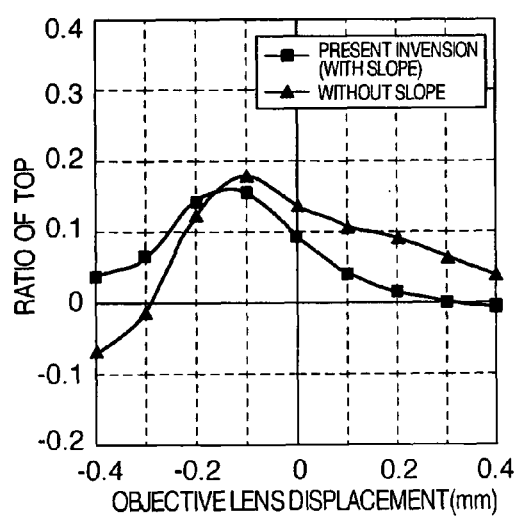
FIGS. 18A and 18B are diagrams explaining the effect of the present invention by means of the light receiving part or a difference in the method of dividing the surface of the diffraction grating in the embodiment 4.
Figure 18B:
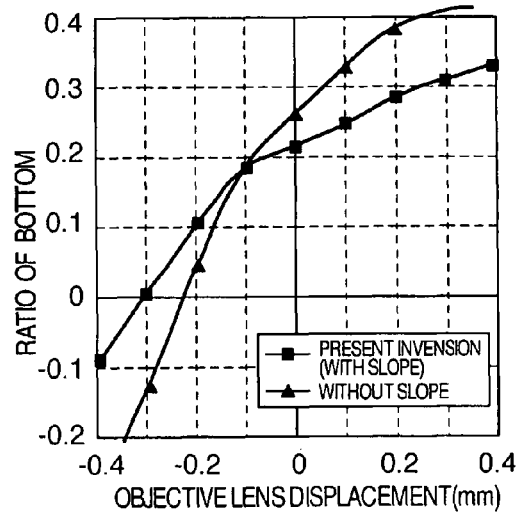

Next, effects will be described that are provided by inclining the dividing lines of the region I and J. FIGS. 18A and 18B show the result of the simulation performed when the dividing lines are inclined. FIG. 18A shows the top ratio, while FIG. 18B shows the bottom ratio. The conditions of the light receiving parts are $t1=0.19$, $t2=0.5$ and $θ=10$ degree, and $t1=0.19$, $t2=0.5$, and $θ=0$ degree.

The top ratio assumes positive values in most regions where the objective lens is displaced, and the bottom ratio is significantly improved at the regions where the objective lens displacement is negative. In this manner, inclined dividing lines would be able to suppress the offset at the boundary between the unrecorded region and recorded region. Especially, a larger improvement effect will be provided in suppressing the DC offset and the offset at the boundary between the unrecorded region and recorded region when 0 degree$<θ<15$ degree, and $0<t1<0.35$, and $0<t2<0.70$, where $t1$ and $t2$ are figures relative to the diameter of the light flux entering the light receiving parts of the light detector 10.

When simply thinking, as shown in FIG. 14, the tracking error signal amplitude seems to extremely decrease if the widths of the regions I and J in the direction of the center axis 500 become smaller as the regions I and J move away from the center axis 500 in the substantially perpendicular direction, because when the objective lens is displaced, the area to be detected decreases in the interference regions (interference region Z1 or interference region Z2) on the light receiving parts region (region I or region J) in the direction of the objective lens displacement. However, actually, when the objective lens is displaced, the intensity distribution of the light flux is displaced at the same time in the objective lens displacement direction by two times the objective lens displacement amount. Therefore, while the area decreases, the intensity increases on the light receiving part region (region I or region J) in the objective lens displacement direction. Moreover, while the intensity decreases, the area increases on the light receiving part region (region J or region I) opposite to the objective lens displacement direction. Therefore, the tracking error signal amplitude is less prone to decrease, and the DC offset is more likely to be corrected. Moreover, the offset at the boundary between the unrecorded region and recorded region greatly occurs at a location near the interference region (interference region Z1 or interference region Z2). Accordingly, it is effective in suppressing the offset at the boundary between the unrecorded region and recorded region to enter the light of the regions other than the interference region onto the light receiving parts on the DC offset detection side when the objective lens is displaced.

Figure 19A:
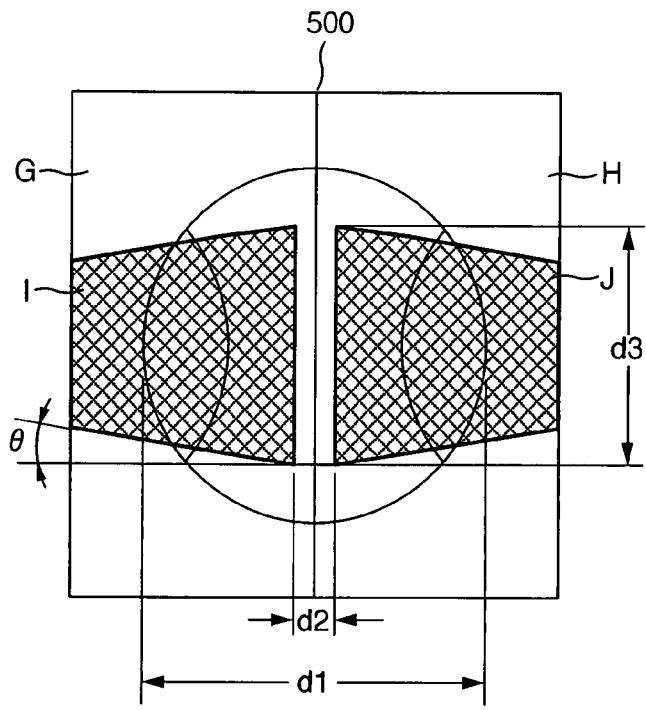
FIGS. 19A and 19B are diagrams showing a light receiving part or a diffraction grating surface other than that shown in FIG. 14 in the embodiment 4.
Figure 19B:
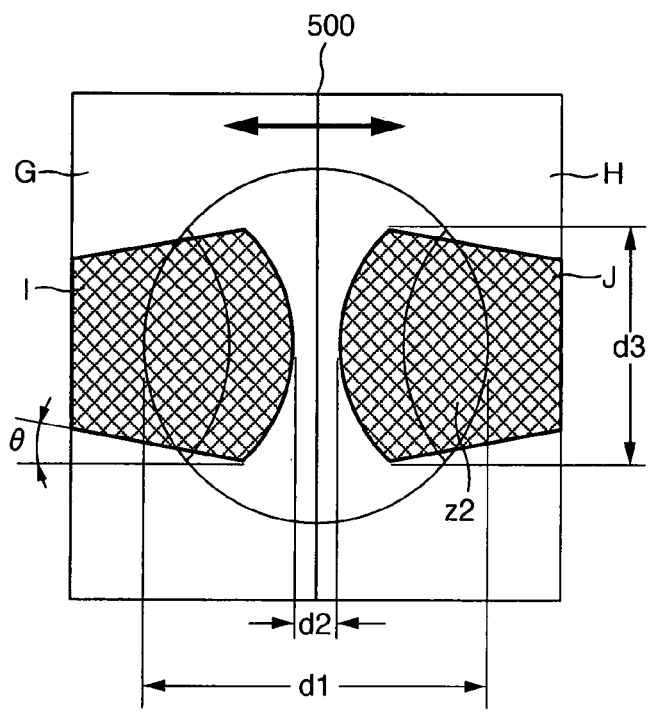
Figure 20:
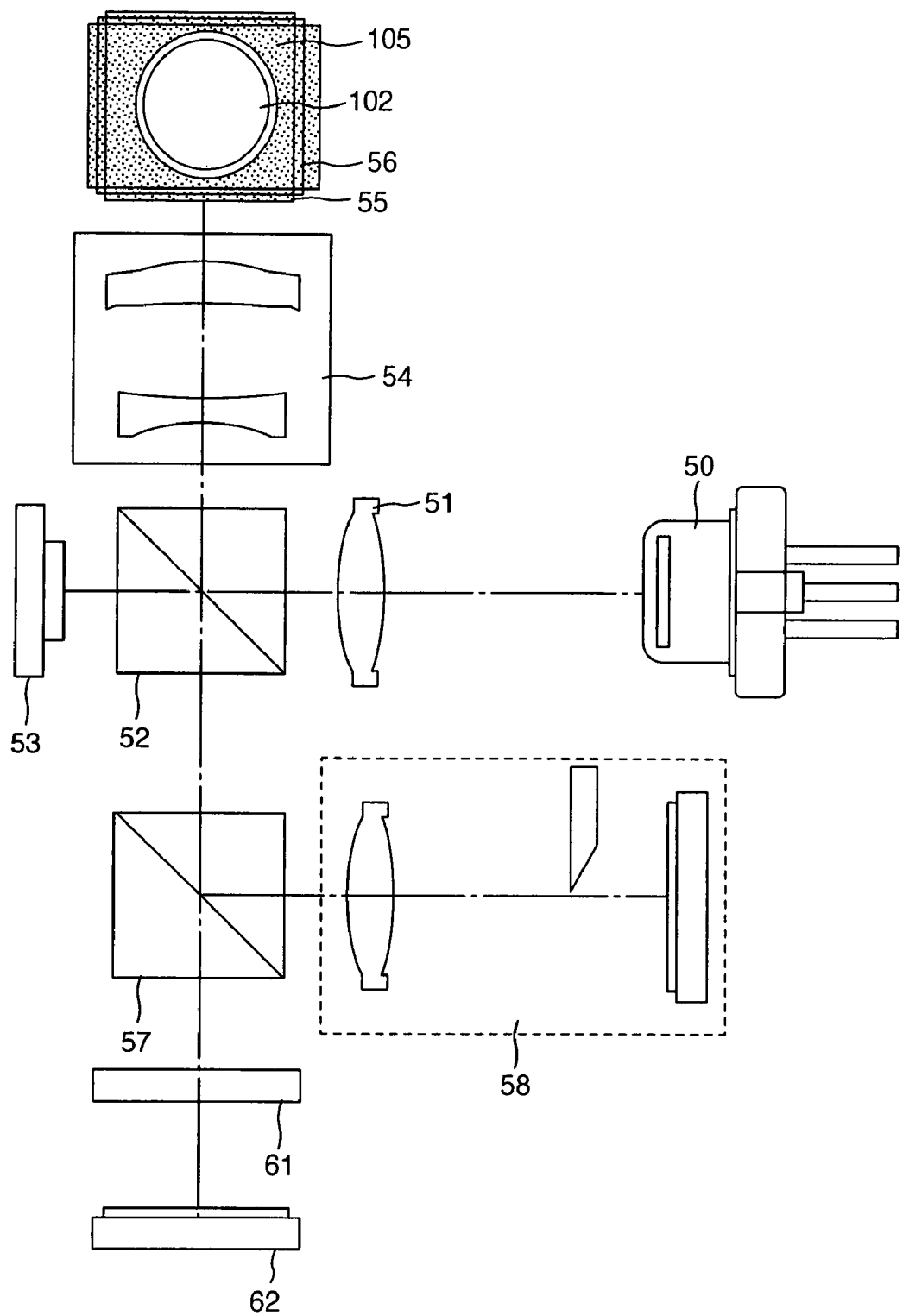
FIG. 20 is a diagram explaining an optical pickup apparatus using the one beam method in the embodiment 4.

While FIG. 14 shows the dividing lines inside the detector by straight lines that are substantially parallel with the track, and straight lines that extend from there to form other angles, it does not matter at all whether the dividing lines inside the detector are arc lines as shown in FIG. 19A, or straight lines as shown in FIG. 19B. Furthermore, while the pattern of the light receiving parts is shown here, it is needless to say that a similar effect is provided by disposing a diffraction grating having the same pattern as that of the light receiving parts like the optical system of FIG. 20, and by changing the diffraction directions and angles in each region to detect signals with a plurality of light receiving parts.

Embodiment 5

Figure 21:
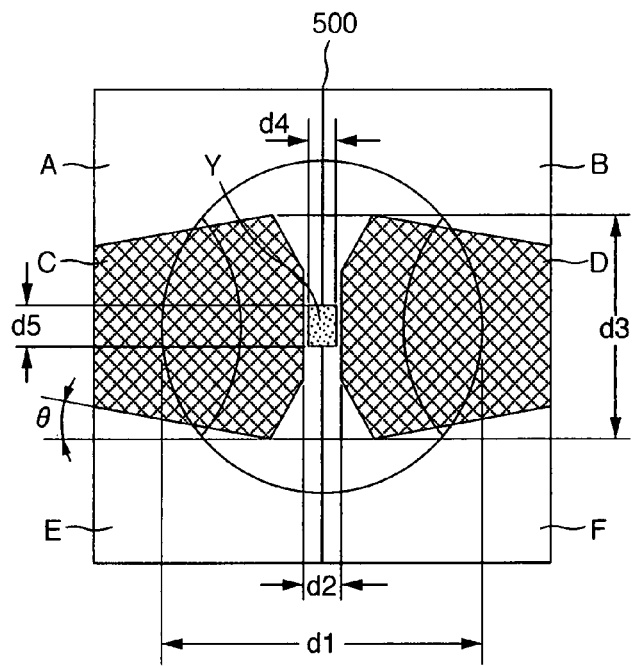
FIG. 21 is a diagram explaining a light receiving part or diffraction grating surface in an embodiment 5.

FIG. 21 shows a pattern of the light receiving part which relates to an embodiment 5 and differs from that of the embodiment 4. A difference from the embodiment 4 lies in that the pattern of the embodiment 5 is provided with a center region Y (region 5). The ratio of the length in the center axis direction of the center region relative to the diameter of the light flux entering the light receiving part of the detector 108 is t3. The ratio of the length in the direction perpendicular to the center axis of the center region relative to the diameter of the light flux entering the light receiving part of the detector 108 is t4. The light receiving part is capable of generating a tracking error signal by performing the following computation.

(tracking error signal)=$(C-D)-k \cdot \{(A-B)+(E-F)\}$  (equation 2)

Figure 22A:
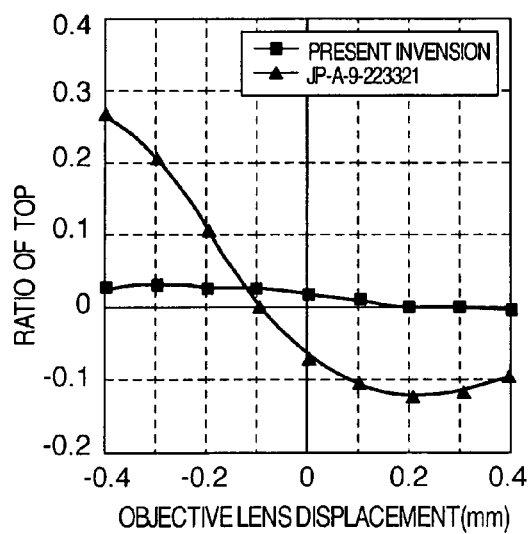
FIGS. 22A and 22B are diagrams comparing the characteristic of the unrecorded region and recorded region in the embodiment 5 with JP-A-9-223321.
Figure 22B:
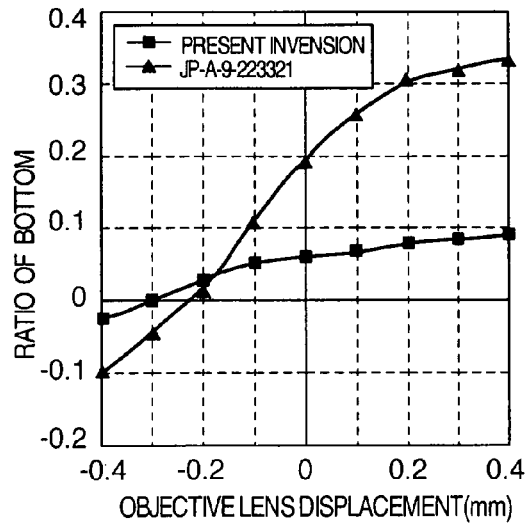

FIG. 22A and FIG. 22B show the top ratio and bottom ratio, respectively, when the light receiving parts of the present invention and JP-A-9-223321 are used, and the objective lens is displaced in the tracking direction. The light receiving parts of the present invention are calculated under the condition that t1=0.19, t2=0.54, t3=0.19, t4=0.19 and θ=10 degree.

As FIGS. 22A and 22B show, the tracking error signal of JP-A-9-223321 changes a lot with a change in the characteristic at the boundary between the unrecorded region and recorded region and the displacement of the objective lens. In contrast, the tracking error signal of the present invention does not change with the displacement of the objective lens, thus making it unnecessary to control particularly the displacement of the lens. Both the top ratio and bottom ratio are positive in most of the objective lens displacement amount, indicating that the offset at the boundary between the recorded region and unrecorded region is suppressed.

The use of the detector pattern such as that of the present invention enables stable tracking control even if the objective lens is displaced. The DC offset as well as the offset at the boundary between the unrecorded region and recorded region are particularly effectively suppressed under the condition that 0 degrees<θ<15 degrees, 0<t1<0.35, 0<t2<0.70, 0<t3<0.35 and 0<t4<0.35, where t1, t2, t3 and t4 are ratios relative to the diameter of light flux entering the light receiving parts of the detector 10.

As described in the embodiment 4, the offset of the boundary between the unrecorded region and recorded region occurs greatly at locations near the interference region (interference region Z1 or interference region Z2), and the center part of the detecting surface occurs little offset. Furthermore, since the region is not detected for a tracking error signal, the coefficient k can be set to an appropriate value. As a result, it is possible to improve the effect of suppressing the offset at the boundary between the unrecorded region and recorded region.

Figure 23A:
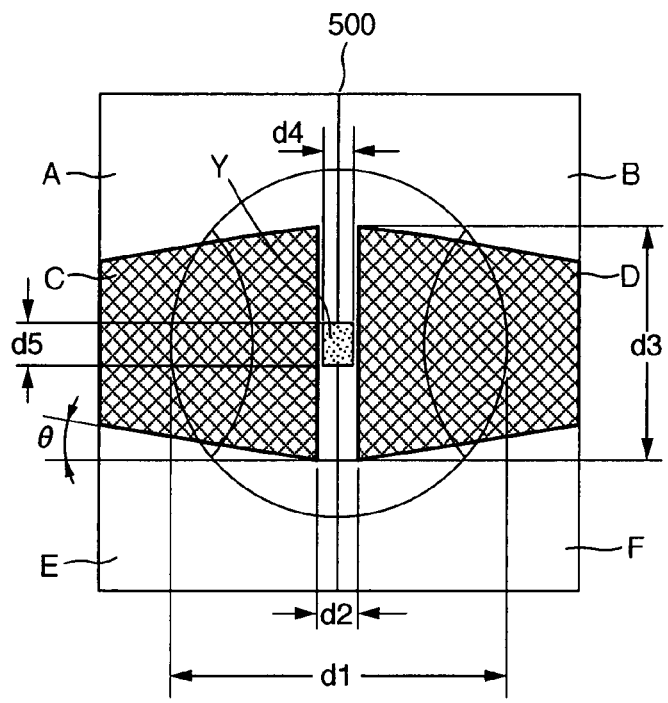
FIGS. 23A and 23B are diagrams showing a light receiving part or a diffraction grating surface other than that shown in FIGS. 19A and 19B in the embodiment 5.
Figure 23B:
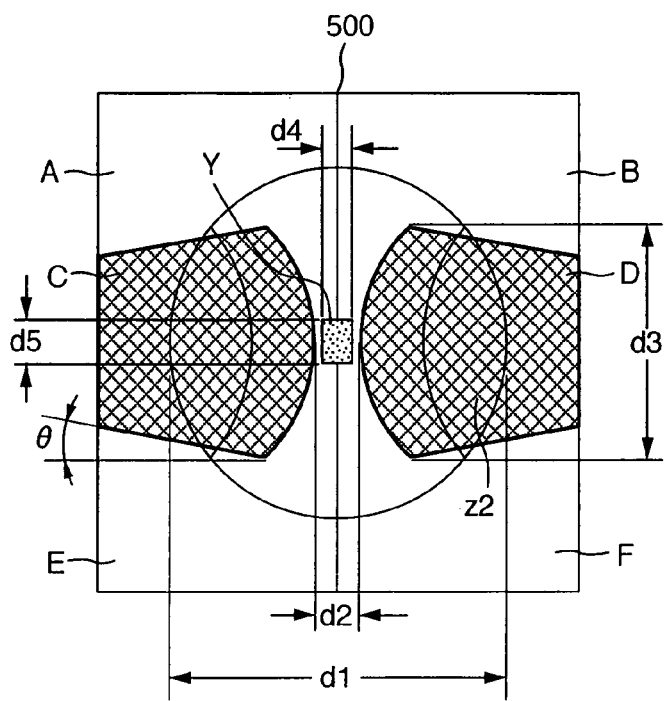

While the dividing lines inside the detector are shown in straight lines that are substantially parallel with the track and straight lines that extend from there to form angles in FIG. 21, the dividing lines inside the light receiving part could be arc lines as shown in FIG. 23A, or straight lines as shown in FIG. 23B.

While patterns of the light receiving parts are shown here, it is needless to say that similar effects are provided by disposing a diffraction grating 61 having the same pattern as that of the light receiving parts shown in FIG. 4 to detect signals with a plurality of light receiving parts on the detector.

Embodiment 6

Figure 24:
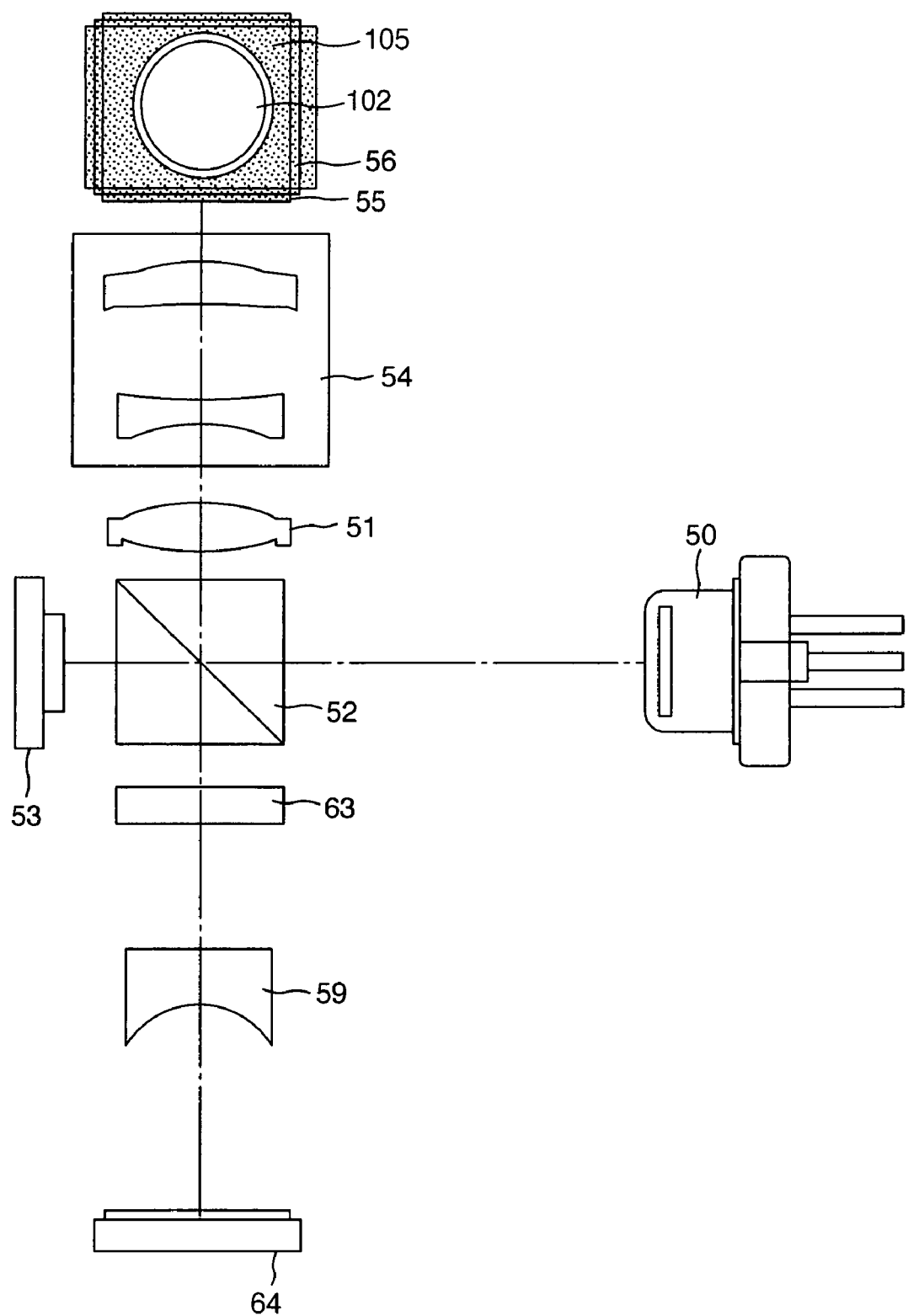
FIG. 24 is a diagram explaining an optical pickup apparatus using the one beam method in an embodiment 6.

FIG. 24 shows an optical system of an optical pickup apparatus relating to an embodiment 6 of the present invention. In the embodiment 6, like numerals are used for like and corresponding parts of the embodiment 4 of the present invention shown in FIG. 13. Although BD will be described here, it could be HD-DVD or other recording type methods.

A light flux with a wavelength of about 405 nm is emitted from a semiconductor laser 50 as a divergent light. The light flux emitted from the laser 50 is reflected by a beam splitter 52. Part of the light flux passes through the beam splitter 52 to enter a front monitor 53. The light flux reflected by the beam splitter 52 is converted by a collimate lens 51 into a substantially parallel light flux. The light flux passing through the collimate lens 51 enters a beam expander 54. The light flux emitted from the beam expander 54 is reflected by a start-up mirror 55, passes through a one-quarter wave plate 56 and is condensed on an optical disc 100 by an objective lens 102 mounted on an actuator 105.

The light flux reflected by the optical disc 100 passes through the objective lens 2, one-quarter wave plate 56, start-up mirror 55, beam expander 54, collimate lens 51 and beam splitter 52.

The light flux passing through the beam splitter 52 is divided by a diffraction grating 63 into a light flux for generating a focus error signal (0th-order diffracted light) and a light flux for generating a tracking error signal (plus first-order diffracted light or minus first-order diffracted light). While a description is made here using the diffracting grating of FIG. 14 relating to the embodiment 4, the diffraction grating of FIG. 19A or FIG. 19B relating to the embodiment 4, or that of FIG. 21, FIG. 23A or FIG. 23B relating to the embodiment 5 can also be used. The light flux divided by the diffraction grating 63 enters a detection lens. The light flux divided by the diffraction grating 63 enters a detection lens. When passing through the detection lens, the light flux is given a predetermined astigmatism, which is used for the detection of the focus error signal. The light flux for generating the tracking error signal is given an astigmatism and spherical aberration when diffracting the diffraction grating 63. Therefore, the light flux passing through the detection lens 59 is condensed on the light receiving parts.

Figure 25A:
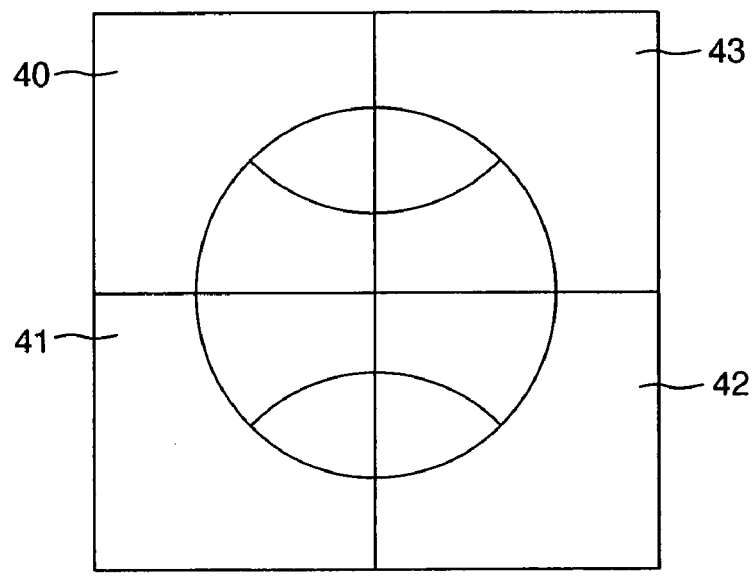
FIGS. 25A and 25B are diagrams explaining a light receiving part in the embodiment 6.
Figure 25B:
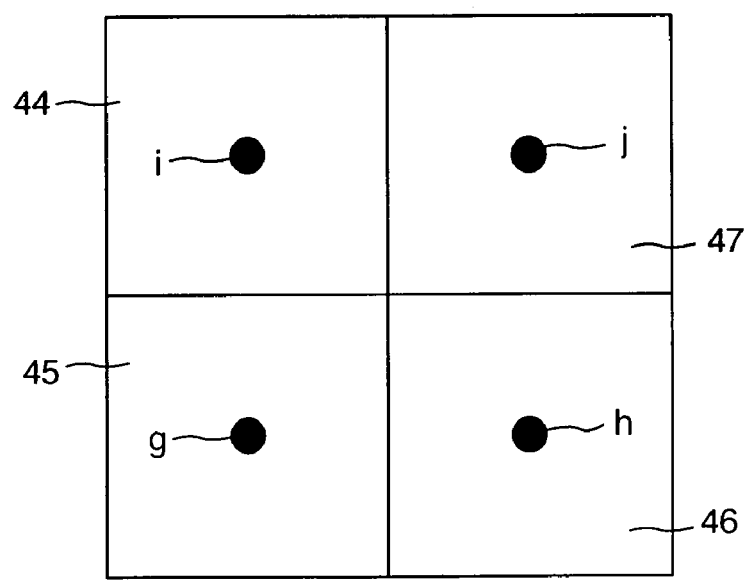

FIGS. 25A and 25B show a detector 64 and light fluxes to be detected. The detector 64 is divided into focus detecting regions 40 to 43 and tracking error signal regions 44 to 47. Since the focus error signals are publicly known, its description is omitted here. The directions of the light fluxes that diffracted the diffracting grating are different in each region, and a light flux diffracting a region G of FIG. 14 enters a region 45 of FIG. 25B, a light flux diffracting a region H enters a region 46, a light flux diffracting a region I enters a region 44, and a light flux diffracting a region J enters a region 47. This causes the tracking error signals to be generated. Here, the RF signal can be detected by obtaining the total of the focus error signals, the total of the tracking error signals, or the total of the focus error signals and tracking error signals. The use of the regions 40 to 43 for focus error signals would also enable DPD (Differential Phase Detection) based on the tracking error signal detection method which is adopted for a DVD-ROM or the like.

Figure 26:
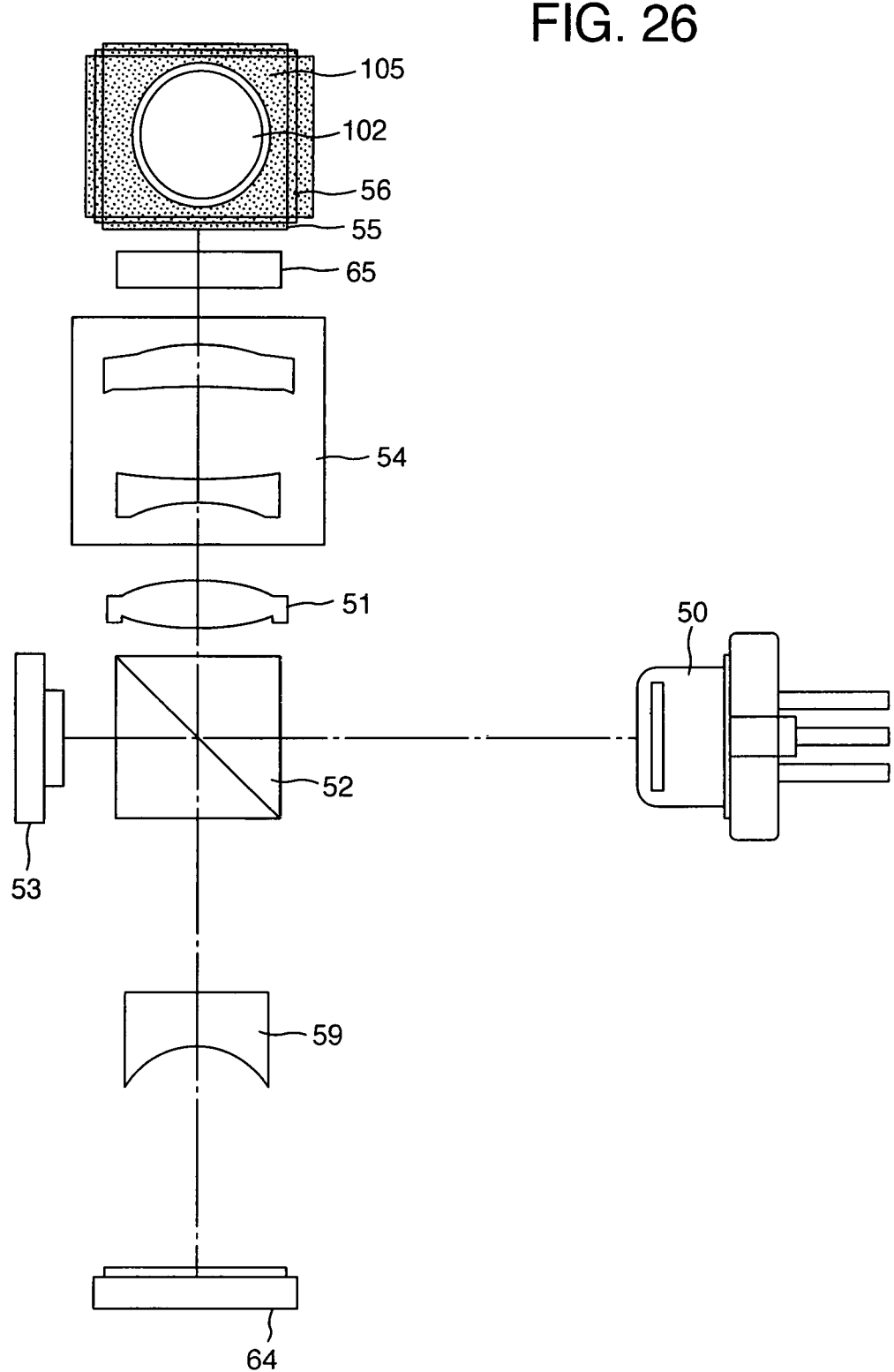
FIG. 26 is a diagram explaining an optical pickup apparatus using the one beam method other than FIG. 24 in the embodiment 6.

With such an optical system structure as described above, it becomes possible to obtain not only the tracking error signals but also other signals. While the diffracting grating 63 is disposed on the detector side here, instead a polarizing diffraction grating 65 can be disposed near the objective lens as shown in FIG. 26.

Embodiment 7

Figure 27:
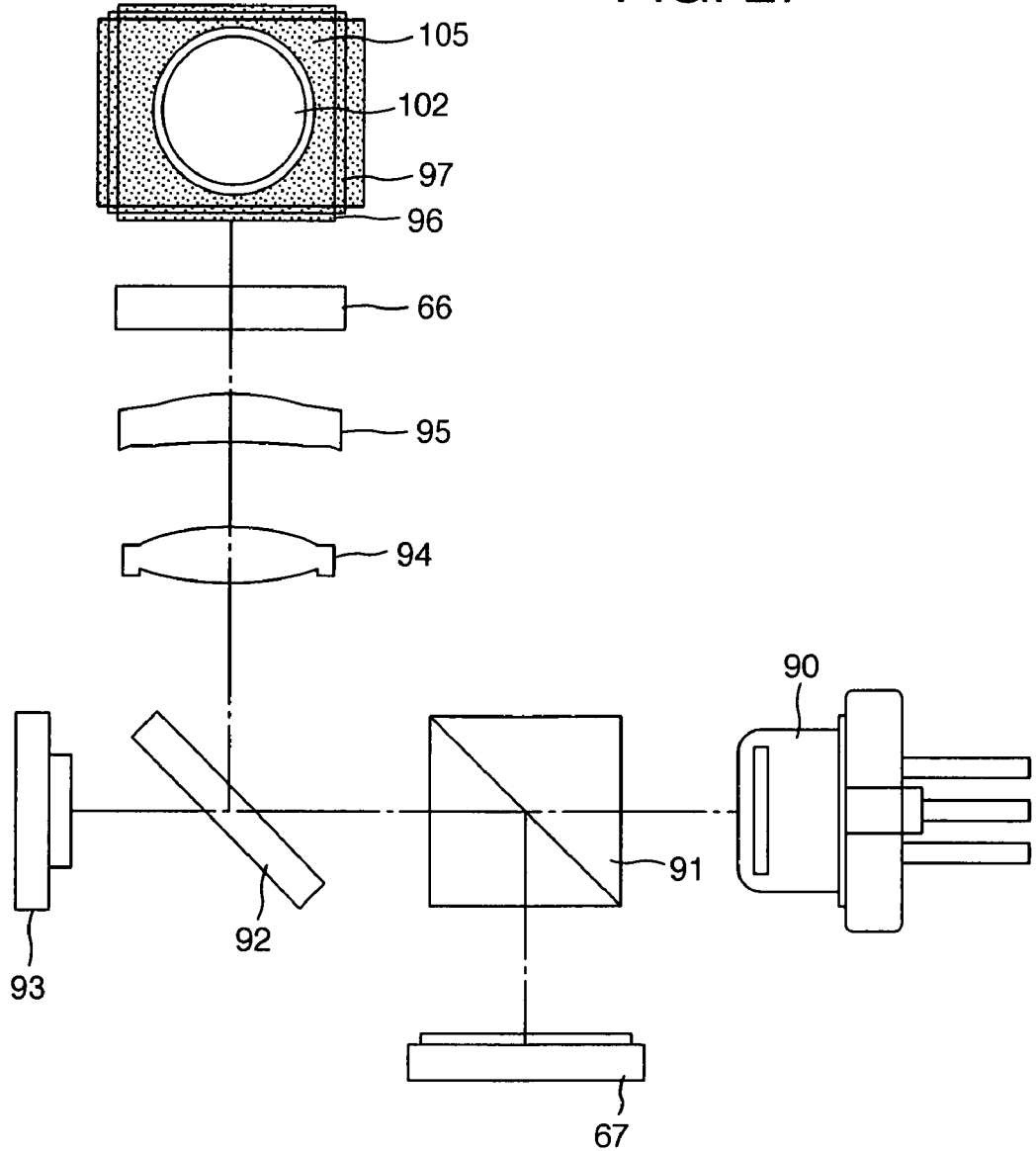
FIG. 27 is a diagram explaining an optical pickup apparatus using the one beam method in an embodiment 7.

FIG. 27 shows an optical system of an optical pickup apparatus relating to an embodiment 7 of the present invention. In the embodiment 7, like numerals are used for like and corresponding parts of the embodiment 4 shown in FIG. 13. Although BD will be described here, it could be HD-DVD or other recording type methods instead.

A P-polarization light flux with a wavelength of about 405 nm is emitted from a semiconductor laser 90 as a divergent light. The light flux emitted from the laser 90 passes through the beam splitter 91 and is reflected by a mirror 92. Part of the light flux outside the pitch diameter enters a front monitor 93. The light flux reflected by the mirror 92 enters an auxiliary lens 94 and then a collimate lens 95. The collimate lens 95, which can be driven in the light axis direction by a driving mechanism (not shown), can change the diverging or converging state of the light flux thereby to compensate the spherical aberration due to the thickness error of a covering layer of an optical disc 100.

The P-polarization light flux passing through the collimate lens 95 enters a polarizing diffraction grating 66 of the present invention. The P-polarization light flux that entered the polarizing diffraction grating 66 passes through the diffraction grating 66, is reflected by a start-up mirror 96, passes through a one-quarter wave plate 97, and thereafter becomes a circularly polarized light. The light flux that became a circularly polarized light is condensed on the optical disc 100 by the objective lens 102 which is equipped with an actuator 105.

The light flux reflected by the optical disc 100 passes through the objective lens 102 and one-quarter wave plate 97. The circularly polarized light is converted into an S-polarized light by the one-quarter wave plate 97. The S-polarized light flux is reflected by the start-up mirror 96 and enters the polarizing diffraction grating 66. The S-polarized light entering the polarizing diffraction grating 66 is divided by the polarizing diffraction grating 66 into a plurality of light fluxes. The light fluxes passing through the polarizing diffraction grating 66 are reflected by the beam splitter after passing through the collimate lens 95, auxiliary lens 94 and mirror lens 92, and then enters a detector 67.

Figure 28:
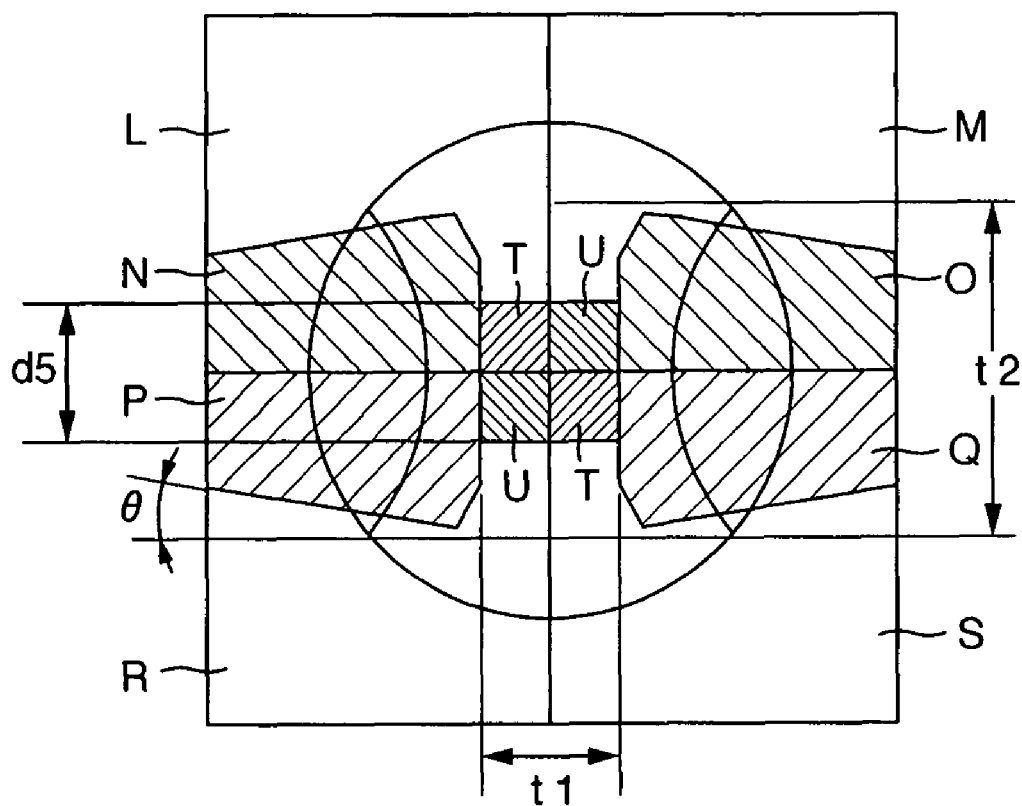
FIG. 28 is a diagram explaining a diffraction grating surface in the embodiment 7.
Figure 29:
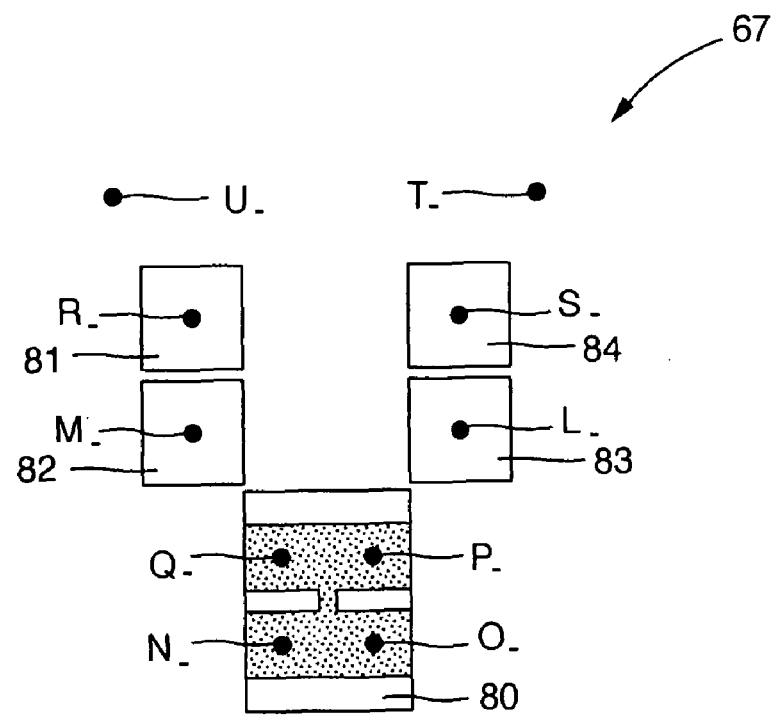
FIG. 29 is a diagram explaining light receiving parts in the embodiment 7.
Figure 29:
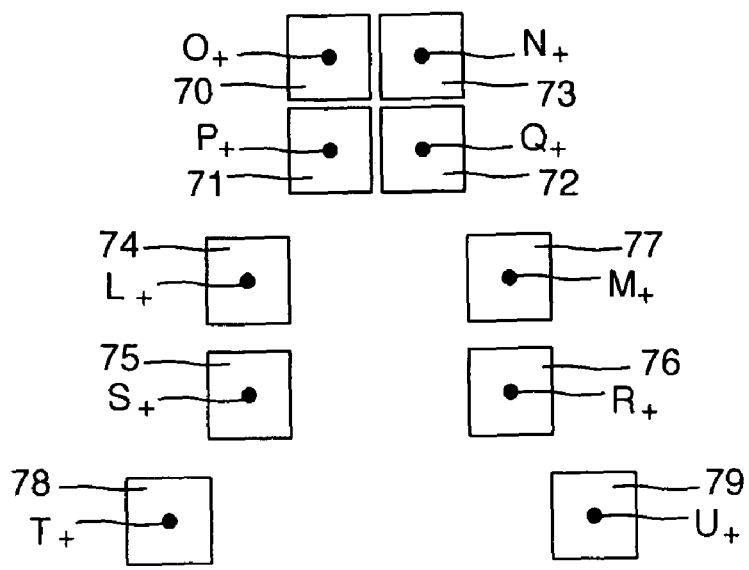

FIGS. 28 and 29 show patterns of the polarizing diffraction grating which consider the tracking error signals as well as focus error signals. FIGS. 27 and 29 show detector 67. In the polarizing diffraction grating 66 is a diffracting grating in which only plus/minus first-order light is diffracted, and the diffraction direction and diffraction angle of each of the diffracted gratings are different in each region. For the sake of simplicity, FIG. 29 shows the light fluxes that are diffracted from each region of the polarizing diffraction grating shown in FIG. 28 by means of characters of the regions. Additionally, a subscript "+" added to the character indicates a plus first-order diffracted light, while a subscript "−" added to the character indicates a minus first-order diffracted light. For example, a plus first-order diffracted light of a region L of the polarizing diffraction grating 66 of FIG. 28 enters a region 74 of a detector 67 of FIG. 29, and a minus first-order diffracted light enters a region 83.

The focus error detection method is based on the knife edge method. Detection is performed by the minus first-order diffracted light diffracted in regions N, P, Q and O of the polarizing diffraction grating 66. Since the knife edge method is publicly known, its description is omitted here. The detection of the tracking error signal can be obtained by performing the following computation using the detection signals of regions 70 to 79 and regions 81 to 84.

$$\text{(Tracking error signal)} = \{(N_+ + L_+) + (P_+ + R_+) - (O_+ + M_+) + (Q_+ + S_+)\} - k \cdot \{(L_- + R_-) + (M_- + S_-)\} \quad \text{(equation 3)}$$

While the polarizing diffraction grating 66 is divided into a plurality of regions for the purpose of detecting focuses or the like, it is the same detection method as FIG. 21 of the embodiment 2 from the viewpoint of the tracking error signal. Moreover, the RF signal detection is obtained by performing the following computation using the detection signals of regions 70 to 79.

$$\text{(RF signal)} = N_+ + P_+ + Q_+ + O_+ + L_+ + R_+ + S_+ + M_+ + T_+ + U_+ \quad \text{(equation 4)}$$

DPD signal detection is also obtained by performing the following computation using the detection signals of regions 70 to 79.

$$\text{(DPD signal)} = \{(N_+ + L_+) + (Q_+ + S_+)\} - \{(P_+ + R_+) + (O_+ + M_+)\} \quad \text{(equation 5)}$$

Such an optical system structure enables obtaining not only the tracking error signals but also other signals.

Embodiment 8

Figure 30:
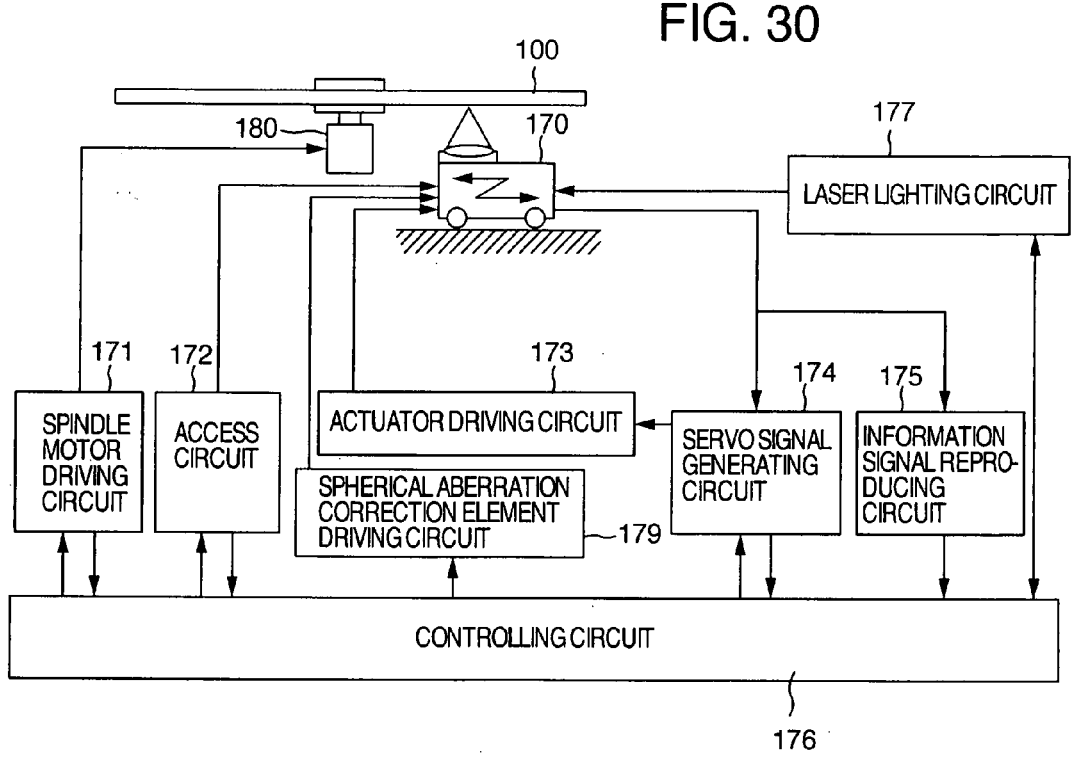
FIG. 30 is a diagram explaining an optical reproducing apparatus in an embodiment 8.

In an embodiment 8, an optical reproducing apparatus equipped with an optical pickup apparatus 101 will be described. FIG. 30 is a schematic structure of the optical reproducing apparatus. The optical pickup apparatus 101 is provided with a mechanism for allowing the optical pickup apparatus to move in the radial direction of the optical disc and is position-controlled in response to an access control signal from an access control circuit 172.

A predetermined laser driving current is supplied to a semiconductor laser in the pickup apparatus 101 from a laser lighting circuit 177, and a laser light of a predetermined light amount is emitted from the semiconductor laser in response to reproduction. It should be noted that the laser lighting circuit 177 can be installed in the optical pickup apparatus 101.

A signal outputted from a light detector in the optical pickup apparatus 101 is transferred to a servo signal generating circuit 174 and information signal generating circuit 175. A servo signal such as a focus error signal, a tracking error signal or a tilt control signal is generated at the servo signal generating circuit 174 based on the signal from the light detector. An objective lens is position-controlled by controlling an actuator in the pickup apparatus 101 via the actuator circuit 173 based on the servo signal.

At the information signal reproducing circuit 175, information signals stored in the optical disc 100 are reproduced based on the information from the light detector. Part of the signals obtained at the servo signal generating circuit 174 and information reproducing circuit 175 is transferred to a control circuit 176. A spindle motor driving circuit 171, the access control circuit 172, the servo signal generating circuit 174, the laser lighting circuit 177, a spherical aberration correction element driving circuit 179 and the like are connected to the control circuit 176. The control circuit 176 controls the rotation, access direction and access position of a spindle motor 180 that rotates the optical disc 100, servo-controls the objective lens, controls the amount of light emitted by the semiconductor laser in the optical pickup apparatus 101, corrects the spherical aberration due to a difference in the disc thickness, and performs others.

Embodiment 9

Figure 31:
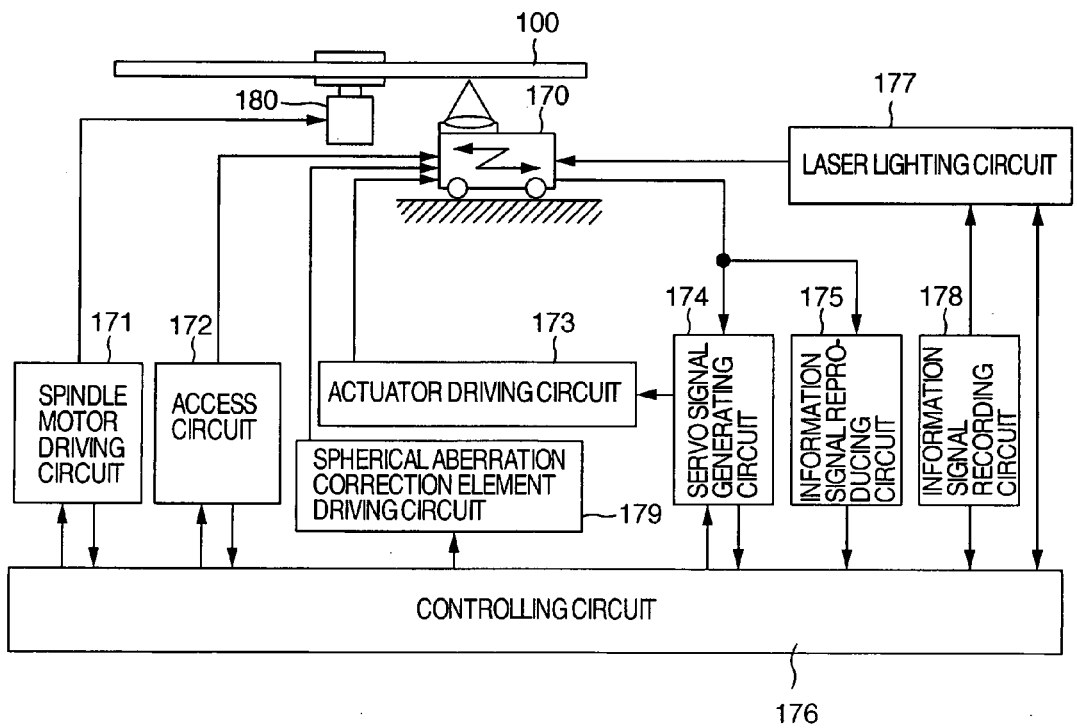
FIG. 31 is a diagram explaining an optical recording and reproducing apparatus in an embodiment 9.

In an embodiment 9, an optical recording and reproducing apparatus equipped with an optical pickup apparatus 101 will be described. FIG. 31 is a schematic structure of the optical recording and reproducing apparatus. A difference of the optical recording and reproducing apparatus of the embodiment 9 from the optical information reproducing apparatus shown in FIG. 30 lies in that the apparatus of this embodiment is provided with an information signal recording circuit 178 between the control circuit 176 and laser lighting circuit 177, and is added with a function for controlling the lighting of the laser light circuit 177 based on the record controlling signal from the information signal recording circuit 178 to write desired information to the optical disc 100.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup apparatus with a single beam system, comprising:
    a semiconductor laser for emitting a laser light;
    an objective lens for irradiating the laser light emitted from the semiconductor laser as a single beam onto an optical disc;
    a diffraction grating for dividing the laser light reflected from the optical disc; and
    a light detector for receiving the laser light divided by the diffraction grating, wherein the diffraction grating has a region 1, a region 2, a region 3, a region 4, a region 5, a region 6 and a region 7;
    the region 1, the region 3 and the region 6 are line-symmetrical to the region 2, the region 4 and the region 7 of the diffraction grating with respect to a center line of the diffraction grating;
    the region 5 of the diffraction grating is further divided into four regions of a region 8, a region 9, a region 10 and a region 11, and the region 8 and the region 10 are formed line-symmetrically to the region 9 and the region 11 with respect to the center line;
    the regions 1 and 2 of the diffraction grating include portions which become narrower in width with the distance away from the center line, wherein the portions also become narrower in width in a light irradiated area of the diffraction grating with distance away from the center line, and the regions 1 and 2 are further divided in two by another line which extends in a direction perpendicular to the center line;
    the portion of the region 1 defines boundaries between the region 1 and regions 3 and 6, and the portion of the region 2 defines boundaries between the region 2 and regions 4 and 7;
    the portions of the regions 1 and 2 extend beyond the light irradiated area of the diffraction grating, so that when the portions of the regions 1 and 2 are at a point of crossing an end of the light irradiated area of the diffraction grating opposite straight edges of the portion of the region 1 are non-parallel to each other and opposite straight edges of the portion of the region 2 are non-parallel to each other;
    signals detected by the light detector from diffracted lights in the region 1, the region 2, the region 3, the region 4, the region 5, the region 6 and the region 7 of the diffraction grating are outputted by the light detector; and
    the center line extends in parallel to a track direction of the optical disc.

2. The optical pickup apparatus with the single beam system of claim 1, wherein each of the regions 1 and 2 has a non-rectangular substantially trapezoidal configuration from a position of a beginning of narrowing of the width of the portions of the regions 1 and 2.

3. The optical pickup apparatus with the single beam system of claim 1, wherein the width of the portions of the regions 1 and 2 is at least partially delimited by the opposite non-parallel straight edges which become closer to one another as the distance from the center line increases.

4. The optical pickup apparatus with the single beam system of claim 1, wherein the width of the portions of the regions 1 and 2 is measured in a direction transverse to the another line.

5. An optical disc apparatus, comprising:
    an optical pickup apparatus with a single beam system comprising:
    a semiconductor laser for emitting a laser light;
    an objective lens for irradiating the laser light emitted from the semiconductor laser as a single beam onto an optical disc;
    a diffraction grating for dividing the laser light reflected from the optical disc; and
    a light detector for receiving the laser light divided by the diffraction grating, wherein the diffraction grating has a region 1, a region 2, a region 3, a region 4, a region 5, a region 6 and a region 7;
    the region 1, the region 3 and the region 6 are line-symmetrical to the region 2, the region 4 and the region 7 of the diffraction grating with respect to a center line of the diffraction grating;
    the region 5 of the diffraction grating further divided into four regions of a region 8, a region 9, a region 10 and a region 11, and the region 8 and the region 10 are formed line-symmetrically to the region 9 and the region 11 with respect to the center line;
    the regions 1 and 2 of the diffraction grating include portions which become narrower in width with the distance away from the center line, wherein the portions also become narrower in width in a light irradiated area of the diffraction grating with distance away from the center line, and the regions 1 and 2 are further divided in two by another line which extends in a direction perpendicular to the center line;
    the portion of the region 1 defines boundaries between the region 1 and regions 3 and 6, and the portion of the region 2 defines boundaries between the region 2 and regions 4 and 7;
    the portions of the regions 1 and 2 extend beyond the light irradiated area of the diffraction grating, so that when the portions of the regions 1 and 2 are at a point of crossing an end of the light irradiated area of the diffraction grating, opposite straight edges of the portion of the region 1 are non-parallel to each other and opposite straight edges of the portion of the region 2 are non-parallel to each other;
    signals detected by the light detector from diffracted lights in the region 1, the region 2, the region 3, the region 4, the region 5, the region 6 and the region 7 of the diffraction grating are outputted by the light detector;

the center line extends in parallel to a track direction of the optical disc; and a servo signal generating circuit for generating a tracking error signal using a signal outputted from the optical pickup apparatus;

wherein the servo signal generating circuit generates the tracking error signal according to (A1−A2)−k×(A3−A4)

wherein, A1 is a signal corresponding to a light incident in the region 1 and detected by the light detector, A2 is a signal corresponding to a light incident in the region 2 and detected by the light detector, A3 is a signal corresponding to a light incident in the region 3 and detected by the light detector, A4 is a signal corresponding to a light incident in the region 4 and detected by the light detector, and k is a coefficient for correcting amounts of light.

6. The optical pickup apparatus with the single beam system of claim 4, wherein each of the regions 1 and 2 has a non-rectangular substantially trapezoidal configuration from a position of a beginning of narrowing of the width of the portions of the regions 1 and 2.

7. The optical pickup apparatus with the single beam system of claim 5, wherein the width of the portions of the regions 1 and 2 is at least partially delimited by the opposite non-parallel straight edges which become closer to one another as the distance from the center line increases.

8. The optical pickup apparatus with the single beam system of claim 5, wherein the width of the portions of the regions 1 and 2 is measured in a direction transverse to the another line.

* * * * *